(12) United States Patent
Graf Plessen

(10) Patent No.: US 11,044,842 B2
(45) Date of Patent: Jun. 29, 2021

(54) PATH PLANNING FOR AREA COVERAGE

(71) Applicant: Mogens Max Sophus Edzard Graf Plessen, Zug (CH)

(72) Inventor: Mogens Max Sophus Edzard Graf Plessen, Zug (CH)

(73) Assignee: Mogens Max Sophus Edzard Graf Piessen, Zug (CH)

( * ) Notice: Subject to any disclaimer, the term of this patent is extended or adjusted under 35 U.S.C. 154(b) by 110 days.

(21) Appl. No.: 15/780,807

(22) PCT Filed: Sep. 27, 2016

(86) PCT No.: PCT/EP2016/072966
§ 371 (c)(1),
(2) Date: Jun. 1, 2018

(87) PCT Pub. No.: WO2017/092904
PCT Pub. Date: Jun. 8, 2017

(65) Prior Publication Data
US 2019/0208695 A1 Jul. 11, 2019

(30) Foreign Application Priority Data

Dec. 3, 2015 (EP) .................................... 15197710

(51) Int. Cl.
*A01B 69/04* (2006.01)
*G05D 1/02* (2020.01)
(Continued)

(52) U.S. Cl.
CPC .......... *A01B 69/008* (2013.01); *A01B 69/007* (2013.01); *G01C 21/20* (2013.01); *G05D 1/0219* (2013.01); *G05D 2201/0201* (2013.01)

(58) Field of Classification Search
CPC ......... G05D 1/0219; G05D 2201/0201; G05D 3/00; G05D 13/00; G05D 2201/00;
(Continued)

(56) References Cited

U.S. PATENT DOCUMENTS

| 5,440,216 A | 8/1995 | Kim |
| 2004/0193349 A1 | 9/2004 | Flann et al. |

(Continued)

FOREIGN PATENT DOCUMENTS

| EP | 1977673 A2 | 10/2008 |
| EP | 2913732 A1 | 9/2015 |
| GB | 2278937 A | 12/1994 |

OTHER PUBLICATIONS

Bondy et al., "Graph Theory With Applications", 1976, pp. 1-24, 51-69, 171-190, The Macmillian Press Ltd., Great Britian.
(Continued)

*Primary Examiner* — Anthony R Jimenez
(74) *Attorney, Agent, or Firm* — The Webb Law Firm

(57) ABSTRACT

A method for planning and optimizing a path of a machinery moving in an area, comprises the steps of: taking coordinates of an area-contour, an operating width of the moving machinery, a distance between the area-contour and a perimetric path within the area-contour as parameters, eroding (mathematical morphological operation) the area by the distance to an interior of the area, thereby obtaining a smaller area delineated by a contour, selecting a lane orientation within the eroded area contour, and partitioning the eroded area into adjacent interior lanes, intersecting the interior lanes with the eroded area contour, thereby generating a lane grid and a corresponding connected undirected transition graph, performing a mathematical algorithm for determining an optimized sequence of position coordinates on the lane grid, wherein a complete area covering path is
(Continued)

generated. This method enables a cost-efficient optimized path of machinery through agricultural fields.

23 Claims, 11 Drawing Sheets

(51) Int. Cl.
*A01B 69/00* (2006.01)
*G01C 21/20* (2006.01)

(58) Field of Classification Search
CPC ....... G05D 2201/02; G05D 2201/0208; G05D 2201/021; G05D 1/02; G05D 1/0221; G05D 1/0223; G05D 1/0225; G05D 1/0227; G05D 1/0246; G05D 1/0268; G05D 1/0274; G05D 1/0276; G05D 1/0278; G01C 21/20; G01C 21/00; G01C 21/04; G01C 21/10; G01C 21/14; G01C 21/16; G01C 21/34; G01C 21/36; G01C 21/3626; A01B 69/007; A01B 69/008; A01L 369/007; A01L 369/008; B60W 2050/0014; B60W 2050/0013; B60W 2050/0019; B60W 2050/0026; B60W 2050/0028; B60W 2050/0027; B60W 2050/0031; B60W 2050/004; B60W 40/00
USPC .......................................................... 701/50
See application file for complete search history.

(56) References Cited

U.S. PATENT DOCUMENTS

2008/0249661 A1 10/2008 Hong et al.
2014/0324345 A1 10/2014 Story

OTHER PUBLICATIONS

Clossey et al., "Solving acr routing problems with turn penalties", Journal of the Operational Research Society, 2001, pp. 433-439, vol. 52; 4.

Eiselt et al., "Arc Routing Problems, Part I: the Chinese Postman Problem", Operations Research, 1995, pp. 231-242, vol. 43; 2.

Eiselt et al., "Arc Routing Problems, Part II: The Rural Postman Problem", Operations Research, 1995, pp. 399-414, vol. 43; 3.

Kruskal, Jr., "On the Shortest Spanning Subtree of a Graph and the Traveling Salesman Problem", Proceedings of the American Mathematical Society, 1956, pp. 48-50, , vol. 7; 1.

Wikipedia, "Eulerian path", https://en.wikipedia.org/wiki/Eulerian_path, printed from the Internet Jul. 3, 2019.

Wikipedia, et al., "Route inspection problem", https://en.wikipedia.org/wiki/Route_inspection_problem, printed from the Internet Jul. 3, 2019.

M1: [ 0 36 35 34 33 32 53 31 32 31 30 29 28 27 26 25 52 24 23 26 25 24 23 22 21 28 27 22 21 20 19 18 17 16 15 14 13 12 11 10 9 51 8 7 10 9 8 7 6 5 12 11 6 5 4 3 14 13 4 3 2 1 2 45 44 43 42 41 40 39 38 37 46 45 46 15 16 37 38 50 47 48 49 50 47 17 18 48 49 39 40 19 20 29 30 33 34 41 42 35 36 43 44 1 0]

M2: [ 0 36 35 42 43 44 45 46 37 38 39 40 41 42 43 36 35 34 33 32 53 31 32 53 31
30 29 28 27 26 25 52 24 23 26 25 24 23 22 21 28 27 22 21 20 19 40 41 33
30 29 20 19 18 17 47 50 49 48 47 50 38 39 49 48 18 17 16 15 46 37 16 15 14
13 12 11 10 9 51 8 7 10 9 8 7 6 5 12 11 6 5 4 3 14 13 41 3 2
1 44 45 2 1 0]

M2: [ 0 40 39 38 37 36 35 34 33 32 31 30 29 28 27 26 25 24 23 22 21 45 20 19 22 21 20 19 18 17 24 23 18 17 16 15 26 25 16 15 14 13 28 27 14 13 12 11 30 29 12 11 10 9 32 31 10 9 8 7 41 44 43 42 41 44 34 33 43 42 8 7 6 5 36 35 6 5 4 3 38 37 4 3 2 1 40 39 2 1 0]

M1: [ 0 20 19 23 28 19 18 17 16 15 14 13 12 11 22 10 11 10 9 8 21 7 6 9 8 7 6 5 4 13 12 5 4 3 2 15 14 3 2 1 0 20 17 16 1 0]

M2: [ 0 20 19 23 18 19 23 18 17 16 15 14 13 12 11 22 10 11 22 10 9 8 21 7 6 9 8 7 6 5 4 13 12 5 4 3 2 15 14 3 2 1 0 20 17 16 1 0]

PATH PLANNING FOR AREA COVERAGE

CROSS-REFERENCE TO RELATED APPLICATIONS

This application is the United States national phase of International Application No. PCT/EP2016/072966 filed Sept. 27, 2016, and claims priority to European Patent Application No. 15197710.5 filed Dec. 3, 2015, the disclosures of which are hereby incorporated in their entirety by reference.

TECHNICAL FIELD

The present invention relates to a method for automatically path planning for optimizing a path of a machinery moving in an area as well as a first software product for performing this method, a second software product using data obtained by this method and a device for performing the method. The invention is especially useful for agriculture, especially open-space agriculture.

BACKGROUND OF THE INVENTION

For the coverage of an agricultural field or agriculturally used work area, in any case, paths for various vehicles or robots of different working widths and scope have to be devised. Vehicles used are not only tractors or harvesters, but include airplanes, helicopters, unmanned aerial vehicles and the like. Robots may comprise machines moving along predefined static guiding rails or markers installed, for example, in artificial environments such as warehouses, buildings or greenhouses. In maritime applications such as fishery and underwater coverage or exploration of specified areas, path planning is also important. The following discussion focuses on open-space agriculture, wherein the other applications are implicitly included in the discussion as well. The discussion includes new considerations of the inventor as well.

By adequate selection of field coverage paths, efficiency with respect to time, energy and utility of available area can be increased. Time is important, in particular, during grain harvesting due to changing weather conditions and the subsequent availability of only a limited number of harvesting hours. Energy (usually Diesel) savings and likewise the reduction of operating hours and wear of the vehicle or agricultural machine are of interest not only for cost reduction, but for environmental reasons and regulatory exhaust emission standards that may potentially become more stringent in the future. Furthermore, by appropriate selection of field coverage paths, the area repressed by the tractor lanes when fertilizing and spraying can be minimized and thus reducing crop damage, while simultaneously not compromising the coverage of the complete field. This implies the maximization of area available for planting and improved yield gains. Besides the above mentioned gains in efficiency, the as precise as possible following of appropriately designed paths is fundamental for the reduction of overlapping and minimization of spraying gaps, which implies precise farming, lowering expensive fertilizer and chemical (herbicides and the like) costs, thereby also reducing the environmental impact.

Throughout a year, a field may be ploughed, sowed or planted, fertilized, sprayed and harvested. Involved vehicles may include a fertilizer spreader, sowing work vehicle, field chopper, mower, tedder, swath-farming work vehicle, tractors and harvesters. In general, operating widths vary. However, some operations are conducted multiple times throughout a year in a repetitive manner and using the same operating width such as, for example, 36 m. This implies the possibility of using a particular created path plan repeatedly.

A typical agricultural field is characterized by being an usually arbitrarily and non-convexly shaped closed area, with potentially sloped terrain, in general arbitrarily shaped contour boundary, and prohibited interior areas around trees, stones, pools, power line poles, masts or similar closed "island"-areas not suited for planting. For the agricultural vehicles, there may potentially be multiple entrance points to the field.

The execution of following a precomputed path can be aided in three major ways: fully autonomous steering, semi-autonomous steering and human operator manual steering with visual and audio support in form of, e.g., mobile tablets, smartphones and displays. A location sensor is commonly employed. Usually satellite-based navigation devices such as GPS receivers (GPS=Global Positioning System) are employed, whose signals may be corrected for improved location accuracy (Differential GPS, RTK=Real Time Kinematic satellite navigation and the like).

Currently, for semi-autonomous navigation solutions, produced set of lanes are disjointed, i.e., at the end of each row, the human driver must disengage the auto-drive, manually direct the agricultural machine to the next (predetermined) entrance point of a lane to be driven, line up the vehicle with the new path, before engaging auto-drive again. There also exist solutions autonomously turning at the headland, where the headland sequence can be programmed in or recorded.

Guidance patterns currently frequently used for field coverage are: straight A-B pattern, A+ pattern (based on degrees direction), identical curve, adaptive curve, center pivot, headland and multi headlands. One of these is commonly selected dependent on the field shape. Alternatively, a given field may be decomposed into sectors, each sector potentially employing one of the aforementioned guidance patterns. Furthermore, multiple different guidance paths may be combined in a field ("pattern grouping" or "freeform"), for example, a straight A-B line together with curved patterns around obstructions or along field contours.

These guidance patterns are suitable, in particular, during seeding for regularly shaped field contours such as rectangles, circles, parallelograms and the like. In such cases, the selection of an appropriate guidance pattern for field coverage is straightforward. The sequence of covering the different lanes usually comprises working sequentially lane-by-lane.

In an agricultural context, US 2004/193349 A1 employs a two-step procedure partitioning the work area into partition areas according to obstacles, concavities and exclusions, where a path plan is determined by, first, determining path plans for each partition area separately, and, second, determining a transfer path plan of transferring from a prior partition to a latter partition until each partition in the work area is traversed. EP 2913732 A1 and EP 1977673 A2 in the context of, first, lawn mower robots and corresponding pattern driving (sequentially lane-by-lane), and, second, wall-following robot cleaners traveling the cleaning region in a zigzag pattern (sequentially lane-by-lane) while moving along a reference wall.

In nature, field contours are often irregularly shaped and include non-plantable islands (trees, power line poles or masts and the like) prohibited from trespassing.

Especially then, it is not obvious how to efficiently plan paths for complete field coverage. Working sequentially lane-by-lane has the advantage of being intuitive, simple to implement and enabling to visually accurately detect and control the area already worked, for example, during ploughing, and thus avoiding overlapping. The inventor realized that more efficient field coverage and path planning techniques can be developed, that do not necessarily require sequential lane-by-lane operations, and that excel the, in general, suboptimal solution of determining multiple partition areas and transfer plans for transferring between the multiple partition areas. The inventor further realized that by the advent of modern sensor technologies allowing accurate location positioning and variable operations of actuators in combination with advanced control techniques, alternative more efficient field coverage and path planning techniques are enabled that do not require sequential lane-by-lane operations, and may be executed autonomously.

SUMMARY OF THE INVENTION

It is therefore an object of the present invention to provide a method for optimized path planning, especially for area coverage, and to provide an easy to handle tool for such planning as well as a tool giving guidance to follow this path.

The inventive method for automatically path planning for optimizing a path of a machinery moving in an area, comprises the steps of considering at least the following parameters:

coordinates of an area-contour,
an operating width of the moving machinery,
a distance between the area-contour and an perimetric closed machinery path within the area-contour,
making a copy of the area-contour and geometrically translating this copy in parallel by the distance to the interior of the area, thereby obtaining an eroded (mathematical morphological operation) area being smaller or equal than the area and the eroded area contour,
selecting an orientation of lanes within the interior of the eroded area contour, denoted as interior lanes preferably selected according to an optimization criterion, and thereby partitioning the eroded area into adjacent lanes and
intersecting the interior lanes with the eroded area contour, thereby generating a lane grid and a corresponding connected undirected transition graph of the area,
performing a mathematical algorithm for determining a shortest possible path, in general, subject to various constraints on the moving machinery, by considering at least the above mentioned parameters, the eroded area and the computed lane grid, thereby determining an optimized sequence of position coordinates on the lane grid, wherein a complete area covering path is generated.

The invention enables path planning, especially for area coverage. A primary application is path planning of vehicle systems within agricultural fields.

The inventive method is part of a general framework for path planning, especially within an arbitrarily shaped closed area. This framework mainly consists of four main steps ranging from the acquisition of position coordinates of the field contour and all non-plantable islands (tree islands, power line poles etc.) to the tracking of the computed coverage path in an autonomous, semi-autonomous or manual manner supported by visual and/or audio guidance and preferably making use of location sensors. The other part of the framework therefore comprises at least the steps of providing at least the parameters mentioned above and making decisions about the heuristics. Different parts of this framework are usually established by different parties, i.e. a trained-person defining the parameters and heuristics, the computing done by a software product and the covering of the area done by a machinery or a driver driving the machinery.

The inventive method preferably uses the following steps:

First, coordinates of a, in general, non-convexly shaped area-contour, contour coordinates of any smaller, in general, non-convexly shaped island areas prohibited from trespassing (obstacles) within the area-contour, an operating width of the moving machinery, a distance between the area-contour and a designated perimetric closed machinery path within the area-contour are determined.

Second, the working area of interest is defined as the difference (mathematical set operation) between the area and all island areas, and thereby defining the working area contour accordingly.

Third, by copying the working area-contour and applying an erosion operation (mathematical morphological operation), an eroded working area smaller than the working area and a corresponding eroded working area contour are obtained.

Fourth, by selecting the orientation of interior lanes and partitioning the eroded working area into adjacent lanes, and by intersecting the interior lanes with the eroded area contour, a lane-grid and a corresponding connected undirected transition graph of the area is generated.

Fifth, a preferential path plan such as the shortest possible path is determined by considering the above mentioned parameters, the eroded working area and the computed lane partition, thereby determining an optimized sequence of position coordinates on the lane grid, whereby a complete area covering path is generated.

In accordance with embodiments, three main path planning modules for area coverage are devised. The modules differ by their optimization and constraint criteria. In addition, customized to the devised path planning modules for area coverage, an overlap-avoiding method is developed for the on/off switching scheduling of fertilizer spreaders or spraying application machineries that are mounted on a vehicle system and operating perpendicularly to the vehicle direction of travel with a specific operating width.

The devised techniques disclosed in this invention can be implemented in manual and semi-autonomous navigation guidance systems. It can be further implemented in autonomous vehicle systems when using high-precision modern sensor technologies allowing accurate location positioning and variable operations of actuators in combination with advanced control techniques.

An inventive first software product performs the inventive method and comprises the algorithm for computing the complete area covering path.

An inventive second software product comprises storing means for storing data referring to the complete area covering path which path is based on position coordinates of the machinery and an output cross-points sequence obtained according to the inventive method, the cross-points referring to coordinates in the interior of the area and the sequence giving the path to be followed by the machinery, and the second software product is able to give guidance to a machinery and/or a user of a machinery in order to enable the machinery to follow the path by using of information of at least one location sensor.

An inventive device for performing this method comprises input means for providing the parameters and for choosing heuristics and wherein the device comprises means for reading of localization measurements returned from a location or positioning sensor, display means for displaying data enabling the machinery and/or a user of the machinery to follow the path and/or output means for delivering data enabling the machinery and/or a user of the machinery to follow the path. The sensor can for example be connected to the device or communicate with the device.

The above mentioned method is done automatically by a software, which can be implemented in a machinery, such as a vehicle, in a computer, in a transportable device or in any other suitable device. It can also be implemented in a special device. The first software product can not only include input means for the parameters and/or the heuristics but can also enable the trained user to choose mathematical algorithms used in the inventive method and to compare different computed paths of the same area. The second software product can be implemented in the machinery or a portable device. This second software product can easily been used by the non-trained driver of the machinery. The software product, when activated, can also directly control the machinery, depending on the machinery itself.

The path is preferably considered to be optimized when its length is minimized and the path can be followed by a most cost-efficient way. The path planning also considered the ability of the machinery to move, such as the ability to turn and the place the machinery needs for moving.

This invention is especially applicable to open-field agriculture. The invention enables a general path planning for the coverage of agriculturally used fields growing crops or other vegetation optimizing the total area coverage pathlength subject to various constraints. However, the invention can be used in alternative applications as well, such as the ones mentioned in the chapter "background of the invention".

The selection of the constraints may involve a first optimization step preceding the actual pathlength minimization. The fields under consideration may be of arbitrarily irregular or nonlinear shape and may include multiple irregularly confined closed non-plantable areas such as tree-islands, power line poles or similar obstacles. An operation width of the agricultural vehicle is provided to the algorithm.

The method therefore likewise allows a path planning, when the parameters additionally include coordinates of a contour of any island being present within the area, wherein the island should not be passed by the moving machinery, and wherein the method comprises the further steps of making a copy of contours of the islands and geometrically translating this copy in parallel by the distance away from the island interior, thereby obtaining an corrected eroded (mathematical morphological operation) area and an eroded island area contour and performing the algorithm based on this corrected eroded area.

Preferably, the method provides as an output at least the sequence of position coordinates of the cross-points in the interior of the area, preferably on the contour and in the interior of the eroded area. The sequence gives the path to be followed by the machinery. The cross-points refer to coordinates in the interior of the area at which multiple driving directions exist, the sequence giving instruction about which one of them has to be taken in order to continue the path, i.e., positions where interior lanes and outside lane or circling tree-island lanes intersect, the cross-points sequence thereby giving the path to be followed by the machinery.

The driver may follow this sequence manually and to follow the optimized path. When semi-autonomous or autonomous steering is used, this sequence is preferably completed with route coordinates lying between the cross-points. These additional coordinates enable the machinery to follow the optimized path along curves or other directions deviating from straight lines. The output data are in any case preferably concatenations of GPS-coordinates.

Preferably, the mathematical algorithm uses graph theory, especially Eulerian graphs, and wherein the cross-points are nodes of the Eulerian graphs, the edges of the Eulerian graphs are referred to as lane-segments or simply as lanes.

Preferably, at least or exact three different path planning algorithms are implied in the method. These three algorithms preferably differ primarily by the avoidance or admittance of extensive turns (around 180°), in the following generally referred to as 180°-turns, performed by the agricultural vehicle, and the enforcement or indifference with respect to an initial closed tracking of the headland path (outside lane). The general objective of these three path planning algorithms is always complete field coverage. These three algorithms, also called modules, are preferably embedded in the above mentioned framework.

Therefore, the inventive method is preferably able to be performed with different kind of mathematical algorithms and depending on the chosen mathematical algorithm, the method is performed considering allowance of 180° turns of the machinery including reverse movement of the machinery or the method is performed by not allowing 180° turns of the machinery including reverse movement of the machinery.

Preferably, the method allows additional parameter input by the user which parameter is considered when performing the method, such additional inputs may be decisions if a 180° turn of the machinery shall be allowed or not.

A first mathematical algorithm (M1) preferably uses as an input at least a connected undirected transition graph ($T_{field}$) of the area, position coordinate information about all cross-points associated with the transition graph and orientation information of the lanes, wherein the mathematical algorithm (M1) makes this connected undirected transition graph ($T_{field}$) Eulerian to obtain an Eulerian graph ($T_{field}^*$), wherein the mathematical algorithm (M1) determines an Eulerian cycle applied on this Eulerian graph ($T_{field}^*$), the Eulerian cycle being described as a sequence of cross-points and wherein the mathematical algorithm (M1) computes a complete area covering path in terms of a concatenation of position coordinates associated with the Eulerian cycle thereby applying appropriate heuristics.

A second mathematical algorithm (M2) uses as an input at least a connected undirected transition graph ($T_{field}$) of the area, position coordinate information about all cross-points associated with the transition graph and orientation information of the interior lanes, wherein the mathematical algorithm (M2) creates an undirected transition graph ($T_{M2}$) by copying the connected undirected transition graph ($T_{field}$) after dismissal of any available edges referring to the eroded (mathematical morphological operation) island area contours, wherein the mathematical algorithm (M2) makes this undirected transition graph ($T_{M2}$) Eulerian by conducting a graph-augmentation in order to obtain an Eulerian graph ($T_{M2}^*$), wherein the mathematical algorithm (M2) determines an Eulerian cycle applied on this Eulerian graph ($T_{M2}^*$), the Eulerian cycle being described as a sequence of cross-points and wherein the mathematical algorithm (M2) computes a complete area covering path in terms of a concatenation of position coordinates associated with the Eulerian cycle thereby applying appropriate heuristics, in particular, for complete field coverage, for example also including all lanes referring to the eroded island area contours if islands are existent.

A third mathematical algorithm (M3) uses as an input at least a connected undirected transition graph ($T_{field}$) of the area, position coordinate information about all cross-points associated with the transition graph and orientation information of the interior lanes, wherein the mathematical algorithm (M3) creates an undirected transition graph ($T_{M3}$) by copying the connected undirected transition graph ($T_{field}$) after dismissal of any edges referring to the eroded (mathematical morphological operation) area-contour, wherein the mathematical algorithm (M3) extends this undirected transition graph ($T_{M3}$) to a connected undirected graph ($\underline{T}_{M3}$) by including at least some of the formerly excluded edges under consideration of heuristics, wherein the mathematical algorithm (M3) makes this connected undirected graph ($\underline{T}_{M3}$) Eulerian by conducting a graph-augmentation in order to obtain an Eulerian graph ($\underline{T}_{M3}*$), wherein the mathematical algorithm (M3) determines an Eulerian cycle applied on this Eulerian graph ($\underline{T}_{M3}*$), the Eulerian cycle being described as a sequence of cross-points and wherein the mathematical algorithm (M3) computes a complete area covering path in terms of a concatenation of position coordinates associated with the Eulerian cycle thereby applying appropriate heuristics, in particular, now incorporating all edges associated with the original connected undirected transition graph ($T_{field}$) of the area.

In case of islands in the interior of the area under consideration, the third mathematical algorithm (M3) can also be extended by further comprising the step of excluding island lanes from the undirected transition graph ($T_{M3}$) and the step of altering the Eulerian cycle by the inclusion of formerly excluded island lane-segments after having determined the Eulerian cycle on the augmented Eulerian graph ($\underline{TT}_{M3}*$) and after having applied heuristics but before the complete area covering path is computed.

The invention enables to increase efficiency in agricultural field-related operations, in particular, with respect to time for field coverage, reduction of energy (Diesel) costs, reduction of operating hours and wear of the agricultural machine and its corresponding beneficial impact on the environment and pollution emissions, responsible precision-orientated usage of fertilizers and chemicals for crop protection, and ultimately maximal utilization of the available plantable area, i.e., minimization of field-parts repressed by vehicle traces. The invention also ensures consistent and repeatable field operations by providing one particular navigation path customized and optimized to the particular field characteristics of interest. In case of semi-autonomous or manual following of this offline computed path, the drivers can concentrate on the execution of tracking the navigation route. This allows consistency in operations for multiple and/or different workers on the same field.

Aspects and/or advantages will be further set forth in the description which follows. A detailed description of preferred embodiments is given below. Embodiments and variants of the invention are further laid down in the dependent claims.

BRIEF DESCRIPTION OF THE DRAWINGS

Preferred embodiments of the invention are described in the following with reference to the drawings, which are for the purpose of illustrating the present preferred embodiments of the invention and not for the purpose of limiting the same. In the drawings, FIG. 1 displays a flow of actions from field-specific data acquisition and user-parameter choices to online tracking of a computed field coverage path including optimization modules M1, M2 and M3 according to the invention.

DESCRIPTION OF PREFERRED EMBODIMENTS

The inventive system and method may use location sensors. As location sensors for agricultural applications, usually satellite-based navigation devices such as GPS receivers (GPS=Global Positioning System) are employed, whose signals may be corrected for improved location accuracy (Differential GPS, RTK=Real Time Kinematic satellite navigation and the like). Alternatively, location sensors include lasers and optics as positioning technologies. In the following, devices capable of determining a position with respect to a particular coordinate system in the teen "location sensor" are summarized. However, other devices may be used as location sensors in the sense of this invention as well.

Figure 3:
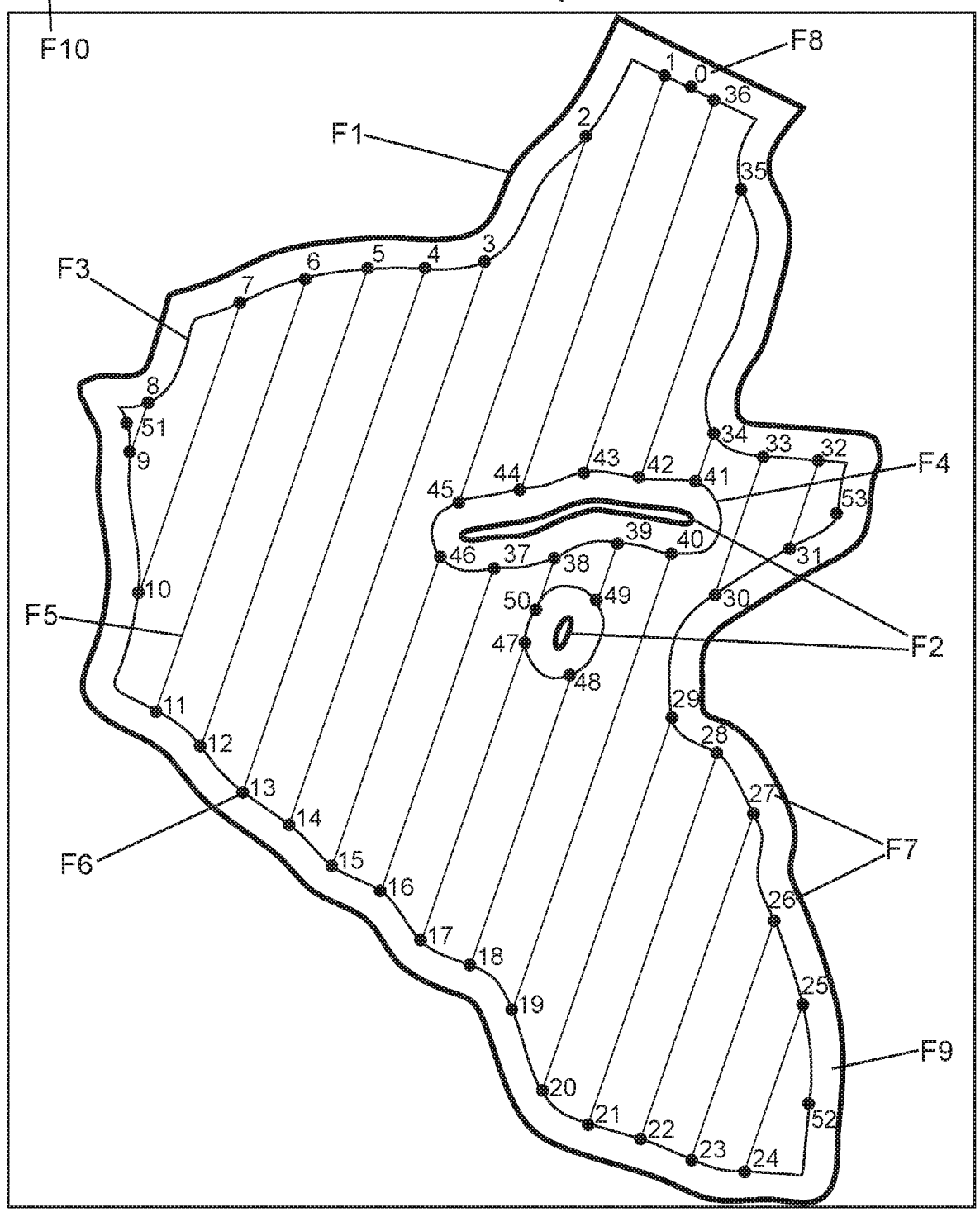
FIG. 3 illustrates an offline-computed path as result of an optimization according to module M1 for an exemplary agricultural field including two interior tree-islands prohibited from trespassing.

The algorithms according to the invention make use of graph theory. For background, see J. A. Bondy and U. S. R. Murty, Graph theory with applications, vol. 290, The Macmillan Press Ltd. London, 1976. A graph is composed of a set of vertices (also called nodes) and a set of edges. With every edge a nonnegative weight is associated. In the setting of the inventive method this weight may be represented by the pathlength of the edge. Graphs are here used to model transitions between particular location positions, also called nodes, along predefined route segments, also called edges, and here also referred to as lane-segments or simply lanes. Nodes are here also referred to as cross-points and are here defined by connecting edges. The term "transition graph" is therefore used. An undirected graph (in contrast to a directed graph) is composed of bidirectional edges, i.e., of edges that may be traversed from either side. A graph is connected if it contains a path between any pair of vertices, where a path is defined as a sequence of edges, or, in other words, a sequence of pairwise adjacent vertices whose edges connect two vertices. An undirected connected transition graph is here denoted by T. The degree of a vertex v in T is the number of edges of T incident with v. For illustration, see node F6 in FIG. 3 which has degree 3, or, more generally speaking, odd-degree since there is an odd number of edges (here 3) incident. In contrast, the start-node 0, see F8 in FIG. 3, is even-degree with 2 edges incident. A tour of T is a closed walk that traverses each edge of T at least once. A graph is Eulerian if there exists a closed traversal using all edges exactly once. If a graph is undirected, necessary and sufficient conditions for a graph being Eulerian are that the graph must be connected and all vertices must be even degree, see J. Clossey, G. Laporte, P. Soriano, "Solving arc routing problems with turn penalties", Journal of the Operational Research Society, vol. 52, no. 4, pp. 433-439, 2001. A connected undirected graph T can be made Eulerian by the augmentation of T, i.e., by replicating (also called duplicating) some edges of T until the resulting T* is an Eulerian graph. A connected undirected graph T always has an even number of odd-degree vertices, see H. A. Eiselt, M. Gendreau, and G. Laporte, "Arc routing problems, part i: The Chinese postman problem", Operations Research, vol. 43, no. 2, pp. 231-242, 1995. Therefore, for a connected undirected graph T the augmentation can be accomplished by solving a matching problem, i.e., duplicating edges (and their corresponding weights) to link odd-degree vertices. Usually, but not necessarily, the augmentation is conducted in a least-cost manner, i.e., finding odd-degree vertex-pairings such that the sum of the weights of the corresponding connecting edges is minimal, see Clossey et al. (2001). Assuming an Eulerian graph T*, an Eulerian cycle (also called Eulerian tour) describes a tour which traverses each edge of T* exactly once. An Eulerian cycle in an undirected Eulerian graph T* can be determined by, for example, the End-Pairing algorithm described in above mentioned Eiselt et al. (1995). The total pathlength of the Eulerian cycle is then the sum of all edges of T*. The traditional terms "vertices" and "nodes" used in graph theory are in this section extended by the descriptive expression "cross-point" and can all be used interchangeably, as mentioned before. The connecting lines commonly called "edges" are here often also labeled as "lane-segments" or simply as "lanes", as also mentioned before. For example, we define "lane-segment" a-b as an edge or a direct path connecting two cross-points or nodes a and b.

In the following, for brevity, it is referred to closed areas around trees, stones, pools, power line poles, masts or similar areas and obstacles not suited for planting and prohibited from trespassing by agricultural machines as "tree-islands" or "islands".

Within this description, the term "180°-turn" is repeatedly occurring. Thereby is meant a cross-point sequence of a-b-a, where a and b are neighboring or connected cross-points according to the underlying transition graph. It is here emphasized that the term "180°-turn" explicitly refers to the direction of the vehicle or machinery movement. Thus, it can, but does not necessarily have to, imply a turning maneuver of the vehicle, but likewise may suggest a back-forth movement, i.e., driving forward along edge a-b and reverse on b-a.

"Online" in the sense of this description means that the results of the inventive method are used on the area, i.e., with the agricultural machinery moving. "Offline" means that the machinery is not moving and/or the method is performed outside of the machinery and not yet interacting with the machinery.

A field or area contour is denoted by F1 in FIG. 3. A geometrically translated lane in the same shape of the field contour is referred to as "perimetric", "outmost" or "headland" lane, all expressions referring to the same, see F3 in FIG. 3 for visualization. Tree-island area contours are indicated by F2 in FIG. 3. The geometrically translated lanes circling a tree-island are denoted as "island lanes" or "circling island lanes"; see F4 in FIG. 3 for illustration. Straight lanes F5 in FIG. 3 are designated "interior lanes" or "straights". These lanes connect two opposite nodes of the "perimetric lane" F3 or a node along the perimetric lane F3 and along the island lane or circling island lane F4. Interior lanes do not necessarily have to be straight for the functionality of the concepts underlying the presented algorithms. Instead, interior lanes may in principle be of arbitrary shape, for example, curvedly aligned to a particular part of the field contour. However, straight lanes are preferred.

Figure 1:
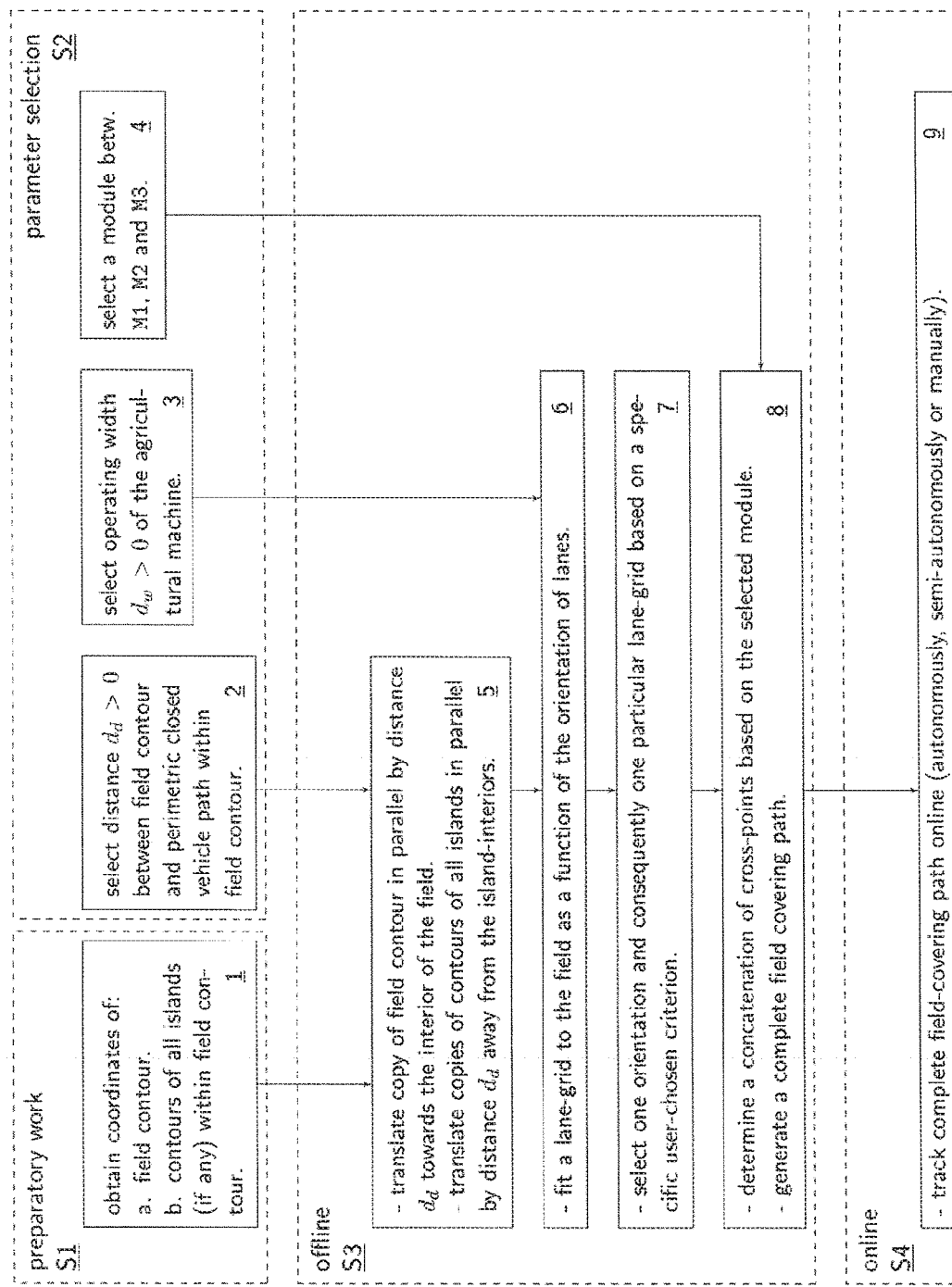

FIG. 1 explains the general framework from preparatory work via offline optimization to online tracking of the computed complete field coverage path. The first step made in the framework, i.e. the preparatory work, is marked in FIG. 1 with reference number S1, wherein reference number 1 refers to a sub-step being part of this preparatory work. Sub-step 1 involves the acquisition of the position coordinates of the field contours of interest and, in case of existence, of the contours of all tree-islands. Preparatory work can, but must not include acquisition of additional data or other kind of work which improves the inventive system and the inventive method.

The mode of this acquisition can be manifold. In descending order of accuracy, one method is to move along the field and tree-island contours while measuring and recording at appropriate distance intervals the positions by means of a location sensor. Alternatively, digital maps incorporating aerial and satellite photographs (for better orientation) may be used that allow the determination of, for example, latitude, longitude and altitude coordinates. Another option is the application of image analysis tools to aerial photographs, field records cadastral registers and the likes in combination with at least two reference points whose pixel- as well as GPS-coordinates are known, that allow an (approximate) conversion between image pixel-positions and the corresponding GPS-coordinates, e.g., expressed in the Universal Transversal Mercator (UTM) coordinate system. The disadvantage of the last two methods is that, for high-accuracy results, they require a free view on field and tree-island contours. Due to natural conditions such as shielding trees and the like this view may often be prohibited. Remedy can be provided by, instead of identifying the contour lines, identifying the (on images) already existing perimetric lane locally parallel to the field contour and likewise the tractor lanes locally parallel to the corresponding tree-islands, whose view is usually available. Otherwise, estimation, approximation and interpolation techniques can be employed. The disadvantage of the identification of the aforementioned already existing tractor lanes is that locally they may not be parallel to the field contours and thus incurring inefficiencies with respect to the usage of the available field area. Furthermore, photograph or image data may be outdated, blurred and noisy. For accuracy, the method described first, i.e., of recording positions while moving along the contours, is to be preferred if available.

As shown in FIG. 1, a second step S2, which is a parameter selection step, is performed which includes a selection of the operating width of the agricultural machine, denoted by $d_w>0$, which also determines the distance between two parallel interior lanes, or the distance between locally parallel lanes in case of curvedly shaped lanes. This selection is marked in FIG. 1 with reference number 3. Reference number 2 refers to the sub-step of selecting a distance between the field-contour and the locally parallel perimetric lane (and correspondingly for the tree-islands). This distance is denoted by $d_d>0$ and is usually selected, for example, as $d_d=d_w/2$. Reference number (4) refers to the sub-step of selecting one of three mathematical algorithms, hereafter also called modules: M1, M2 or M3. These algorithms/modules M1, M2, M3 will be explained in more details later in this text.

A third step (S3) of the framework is preferably computer-implemented. It is automatically performed by the inventive method. This step S3 can be established in a software product, such as a computer program. Input means can be provided for inputting the results of first and second steps S1 and S2. However, a software product for establishing either one or both of first and second steps S1 and S2 can be provided as well. In addition, all these software products can be combined in a single software product and/or can be provided in one single device. This also applies for the fourth step described below, which can be a separate software product and device or combined with one, two or any of the first, second and third step S1, S2 and S3.

The third step S3 is conducted offline based on the data acquired from the first step S1 and the second step S2, i.e., the parameter selection step. First, the perimetric lane and circling islands lanes (if islands are existent) are computed by the application of a geometrical translation technique, so-called erosion (mathematical morphological operation). This is shown in FIG. 1 with reference number 5. A simple technique for its implementation is treating the contour lines as piece-wisely affine line-fragments that can be geometrically translated by distance $d_d$ in parallel. In a post-processing step, the resulting line is pruned to ensure keeping of a distance at least $d_d$ to the field or island contours. Refinements of this method include preliminary interpolations and/or averaging. Consult also FIG. 3 for visualization of the results, in particular, the field contour F1, the corresponding locally parallel translated closed perimetric lane F3, the tree-island contours F2 and their related locally parallel translated closed lanes F4. In preferred embodiments and variants of the inventive method, the beneficial impacts of structured field coverage cannot be underestimated in view of optimal utilization of the available plantable area. In these cases, an accurate parallel translation technique is therefore fundamental.

Taking the operating width selection performed in sub-step 3 into account, a lane grid is fitted as a function of the orientation of interior lanes by intersecting the interior lanes with the eroded area contour, thereby generating a lane grid. This sub-step is marked in FIG. 1 with reference number 6. This lane-grid in combination with the designated operating width ensures the coverage of the complete work area, i.e., the agriculturally used field. The vehicles will preferably move in the end along these lanes and will cover each lane separately.

In a further sub-step bearing reference number 7, an orientation and its corresponding lane-grid is selected. This step is a fundamentally important user-choice that usually already involves an optimization step preceding the subsequent minimization of the total coverage pathlength, in general, subject to constraints on the moving machinery. This is shown in FIG. 1 with reference number 8. An orientation in sub-step 7 which may be chosen according to, for example, the following list of criteria:

Minimization of the sum of the pathlengths of all interior lane (usually straights) in between the perimetric lane and the closed island lanes (if existent); this criterion is of particular interest since it implies the minimization of repressed area which as a consequence is then available for additional planting.
  Minimization of the total field coverage pathlength. In contrast to minimizing the sum of the pathlengths of only the interior lanes, perimetric and tree-island lanes that (potentially) are traversed multiple times for complete field coverage according to paths which have been optimized according to modules M1, M2 or M3, are now considered, too. In general, the corresponding orientation may be different for each of the three modules M1, M2, M3 and it may differ from the orientation associated with the minimization of only the sum of the pathlengths of all interior lanes.
  Minimization of the total number of turns at headland.
  The avoidance of volts and sharp turns, which may exclude particular orientations of the lane-grid.
  The avoidance of roll angles of the vehicle above a certain threshold resulting from field slopes in hilly terrain.
  The selection of a curved lane pattern aligned to a particular part of the field contour.
  Considerations about connections to roads, harvesting organization and logistics in general.
  Combinations and/or trade-offs of aforementioned criteria. For example, the combination of minimizing the sum of the pathlengths of all interior lanes while simultaneously avoiding roll angles of the vehicle above a certain threshold resulting from field slopes.

The selection of the lane-grid implies the locations of the cross-points, i.e., positions where interior lanes and perimetric lane or circling tree-island lanes intersect. See F6 in FIG. 3 for the visualization of such a cross-point. As illustrated by F7 in FIG. 3, the cross-points are numbered. The starting and end position is assumed to be identical and is denoted by 0, see F8.

In sub-step 8, based on the previously determined lane-grid, all cross-points are concatenated efficiently minimizing the total field coverage pathlength taking one of the three modules M1, M2 or M3 into account. For an exemplary field with two tree-islands, F10, F11 and F12 illustrate the concatenations of cross-points resulting from one of the optimization modules M1, M2 and M3. Ultimately, by knowledge of the coordinate locations of all cross-points and linking lanes, the complete field covering path can be reconstructed, which completes the offline part visualized in FIG. 1. The machinery has just to reach each of these cross-points in the order shown in F10, F11 and F12 in order to cover the area in the cost-optimized and most efficient optimized way.

A fourth step S4 comprises the online tracking of the offline-generated field covering path computed in the third step S3. This can be carried out in an autonomous manner, i.e., fully automated by the help of sensors, actuators and control logic. Alternatively, it may be realized semi-autonomously in the sense that a human-driver is involved and may at least intercept and take over actuators such as steering wheel, propulsion and braking systems. Ultimately, the planned path can be tracked manually by a human driver with audio and visual support, i.e., in form of a navigation system with display and audio commands for the immediate way ahead until the path is tracked completely and the field is covered.

Figure 2:
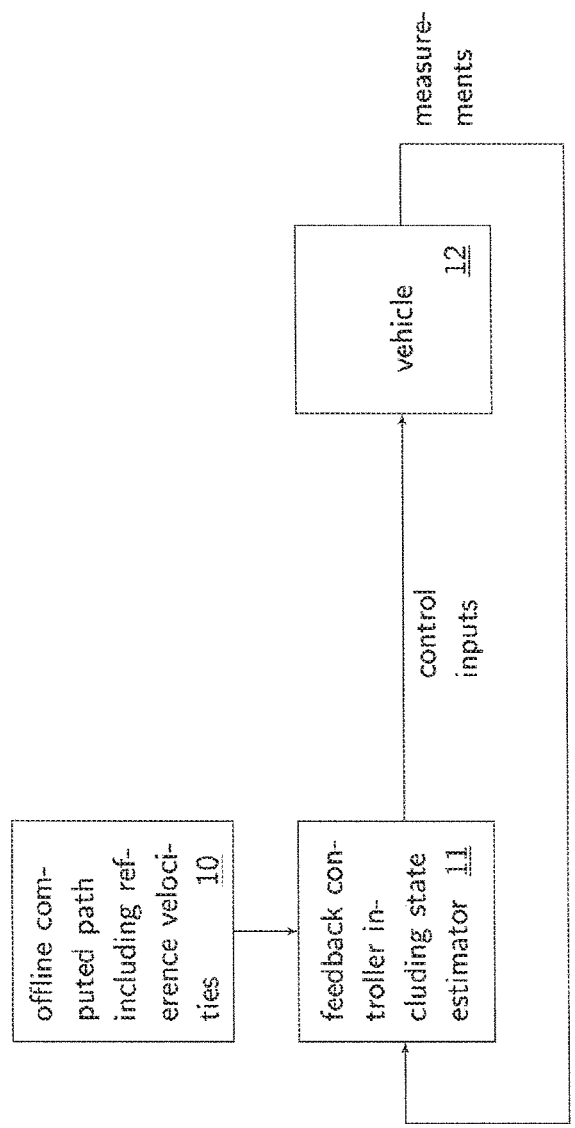
FIG. 2 illustrates a closed-loop control architecture of a vehicle system for field coverage tracking of an offline-computed path.

FIG. 2 visualizes a simplified closed-loop control architecture according to the invention which may be used in the fourth step S4 of FIG. 1 when conducting online path tracking in an autonomous manner. The offline computed field coverage path in combination with additional information such as reference velocities for the vehicle along the path, for example, different along interior lanes, turns and other maneuvers is stored in storing block 10. It is accessed by the feedback controller block 11 which also includes a state estimator, for example, for fusion of sensor measurements (measured states), in particular, location measurements (usually GPS) with a dynamical model of the vehicle system. The input signals computed by the feedback controller are fed to the vehicle system 12, i.e., applied to the actuators. These steps are repeated at every sampling time.

A possible implementation of subtasks or sub-steps 5, 6, 7 and 8, as indicated in FIG. 1, is described below in procedure P, whereby details about the three specific optimization modules M1, M2 and M3 are given in the descriptive first, second and third algorithm A1, A2 and A3. All of the three modules M1, M2 and M3 optimize the total area coverage pathlength; however, the methods used by each module M1, M2, M3 are subject to different constraints or heuristics.

The objective of the first module M1 is to minimize the total pathlength needed for the complete coverage of all edges associated with a transition graph (preferably modeling all field lanes) and starting and ending at the same point (cross-point number 0, see FIG. 3 for illustration). Note that the connected undirected transition graph modeling all lanes and its corresponding cross-point connections associated with a particular field is, throughout this section, always denoted by $T_{field}$. Even though heuristics are applied to avoid 180°-turns as often as possible, it is explicitly emphasized that the minimal total coverage pathlength associated with the method of the first module M1 is always maintained. Thus, the shortest overall pathlength is never meant to be compromised or prolonged. The first optimization module M1 gives the shortest path, but no guarantee on the avoidance of undesirable maneuvers such as, most importantly, 180°-turns. The complete avoidance of undesirable maneuvers such as 180°-turns can be achieved by the introduction of additional path-altering heuristics as done for the second and third optimization module M2 and M3.

The motivation for the introduction of the second optimization module M2 is to obtain a solution yielding a field coverage pathlength close to the minimum achieved by the first algorithm A1 used in the first module M1, while at the same time always avoiding 180°-turns. This task is achieved by the admittance of particular and (preferably clear-defined) heuristics that usually are to some very limited extent pathlength-compromising. Two heuristics defining differences of the method according to the second module M2 with respect to the method according to the first module M1 are described later in this text. Another difference, occurring only in case of the existence of tree-islands, refers to the particular method of making $T_{M2}$ Eulerian by conducting a graph-augmentation yielding $T_{M2}*$, see the second algorithm A2.

The procedure P mentioned above is described in the following:

Procedure P for implementation of sub-steps 5, 6, 7 and 8 according to FIG. 1:

1: Preparation:
   Import location data: at least latitude and longitude positions at appropriate contour-defining spaces along the field contour and contours of all tree-islands in the interior of the field.
   Conversion of the latitude and longitude data to UTM-coordinates (in order to being able to calculate in unit meters).
   Parameter selection of $d_d$ and $d_w$.
   Definition of arbitrary constraints of interest, such as maximal admissible degree of roll angle of the vehicle due to terrain slope and the like.
   Application of a geometric translation technique in order to determine the perimetric lane (e.g., F3 in FIG. 3) locally parallel to the field contour (e.g., F1 in FIG. 3).
   Likewise, in case of the existence of tree-islands, application of a geometric translation technique in order to determine the circling island lanes, see F4, locally parallel to the respective tree-island indicated by F2 in FIG. 3.

2: For a set of different lane-orientation angles do

3: UTM-coordinate system transformation:
   Rotation of all available coordinates by the current angle (out of the set of lane-orientation angles) with the help of a standard 2D (two dimensional) rotation matrix.
   This rotation is of interest only in case of the intention of fitting straight lanes (see F5 in FIG. 3 for an example) to the field area of interest (in contrast to fitting lanes adjusted to the shape of one of the field contours).
   This rotation is done only to facilitate subsequent computations.

4: Computation of all positions of cross-points considering the $d_w$-parameter:
   See F6 in FIG. 3 for illustration of a cross-point.

5: Labeling of cross-points:
   The intended starting and end point for the field coverage path, which is usually the entrance point to the field, is arbitrarily always denoted by 0.
   Cross-points may be numbered in ascending order, see FIG. 3 for illustration.

6: Establishing of lanes (edges) by connection of cross-point pairs:
   See FIG. 3 for visualization.

7: Creation of a connected undirected transition graph, denoted by $T_{field}$, including auxiliary cross-points to ensure unique connections between any two vertices:

Information held by transition graph $T_{field}$ is at least the connection between any available cross-points and the associated distance (e.g., in unit meters).

Determination of position coordinates of all nodes and edges associated with the given transition graph.

The corresponding edges have to be described by a sufficient number of coordinates such that correct shape information is ensured.

With respect to FIG. 3, cross-points auxiliary introduced are 51, 52 and 53.

For example, without the introduction of cross-point 52, see F9, the connection between cross-points 24 and 25 would not be unique.

8: Analysis of an optimization criterion:

I.e., check the results obtained for the current orientation with respect to a particular optimization criterion.

One particularly useful criterion is the minimization of the sum of pathlengths of all interior lanes between perimetric lane and the closed island lanes (if existent) under the additional constraints of avoidance of roll angles of the vehicle above a certain user-defined threshold and the avoidance of volts and sharp turns.

This particular criterion is equally valid for all three M1-, M2- and M3-modules.

There exist several alternative optimization criteria, which may involve more computations and explicit differentiations between the M1-, M2- and M3-module described in this text as well.

9: End for

10: Selection of a particular lane-orientation:

Determine the best orientation with respect to a chosen optimization criterion under consideration of any existent additional constraints.

Storage of relevant information corresponding to this specific orientation.

Relevant information comprises: angle, transition graph, position information about all cross-points and edges, for example, described in the rotated UTM-coordinate system.

11: Computation of one or several of the three respective solutions associated with the three optimization modules M1, M2 and M3:

For M1: see algorithm A1.

For M2: see algorithm A2.

For M3: see algorithm A3.

A particularity of the method steps of both the first and the second module M1 and M2 is the coverage of the perimetric lane-segments "on-the-fly". This implies, that the perimetric lane-segments do not have to be passed consecutively, i.e., by just driving once along the perimetric lane, before then starting to cover the straight lanes (interior lanes). Instead, lanes may be concatenated arbitrarily, in a total pathlength minimizing manner. In case there exist tree-islands, the circling island lanes are covered on-the-fly only for the method according to the first module M1, whereas for the method according to the second module M2, a heuristic is applied, see algorithm A2.

In current practice, a common guidance pattern employed at present by many agricultural vehicle drivers is initially to once drive along the perimetric lane before then working sequentially lane-by-lane in a typical A-B pattern (or similarly, first working the interior lanes before then ultimately circling the complete perimetric lane).

The inventive method according to the third module M3 is motivated by this behavior. Thus, associated with the method according to the third module M3 is the heuristic of first always driving around the perimetric lane and thereby covering all of its associated lanes.

However, in contrast to then following an A-B pattern, the third algorithm A3 of this third module M3 is used instead to plan the path minimizing the pathlength associated with the coverage of the remaining not-yet serviced interior lanes. See the highlighted cross-point sequence in F12 of FIG. 5 for illustration of the initial circling of the perimetric lane. The third algorithm A3 is intentionally designed such that any 180°-turns are always avoided. The heuristics described below are both used for the third module M3 when altering the Eulerian cycle associated with transition graph $\underline{T}_{M3}^*$, see Algorithm A3. The two heuristics, i.e., the initial circling of the perimetric lane and the circling of tree-island lanes as soon as any cross-point associated with the corresponding tree-island is reached for the first time by the vehicle, naturally imply that for the coverage of the remainder of the field, the not-yet serviced interior lanes (usually straights) have to be concatenated efficiently in a least-cost manner by connecting them via some of the perimetric or tree-island lanes. See H. A. Eiselt, M. Gendreau, and G. Laporte, "Arc routing problems, part ii: The rural postman problem", Operations Research, vol. 43, no. 3, pp. 399-414, 1995.

Figure 4:
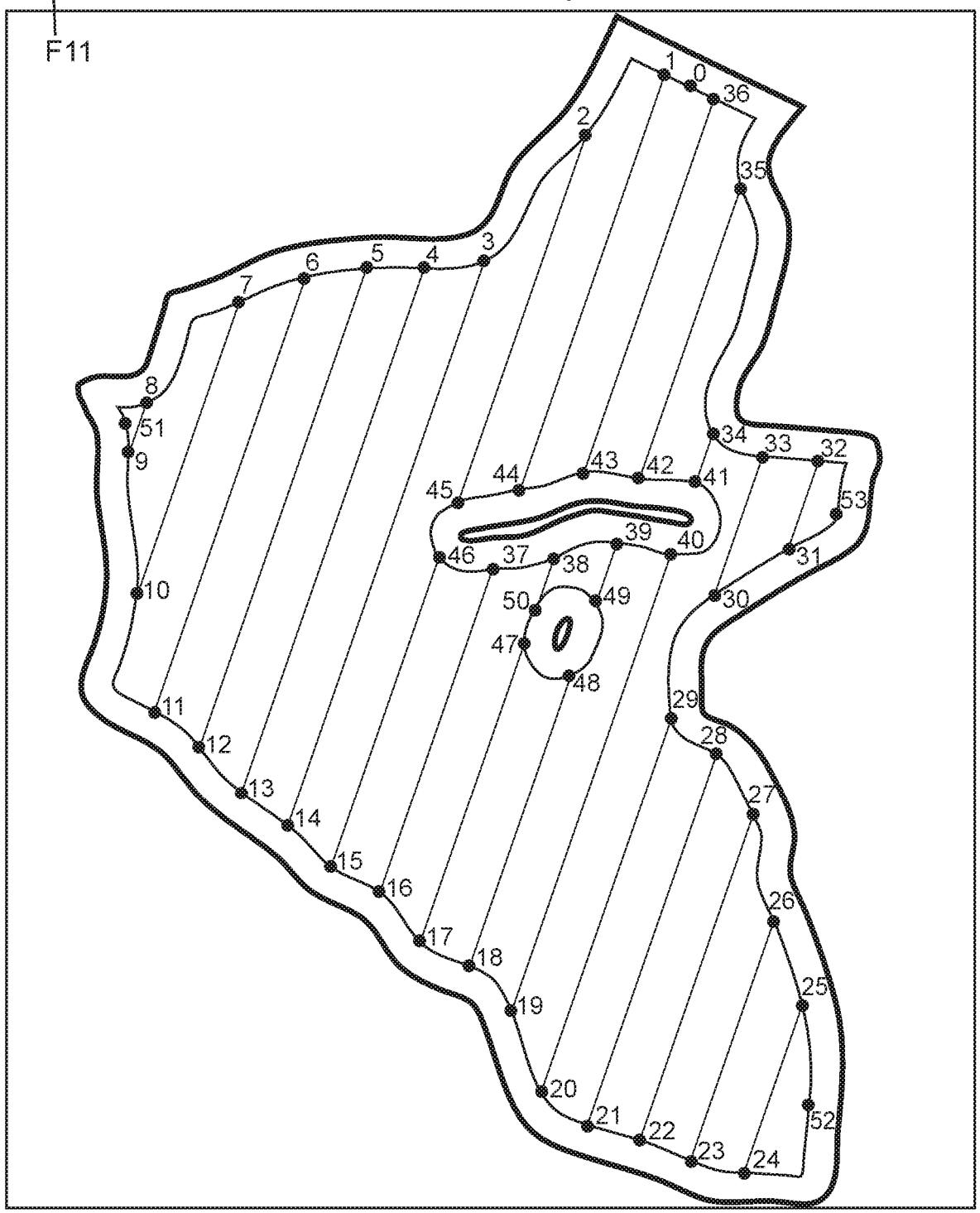
FIG. 4 illustrates an offline-computed path as result of an optimization according to module M2 for an exemplary agricultural field including two interior tree-islands prohibited from trespassing.
Figure 5:
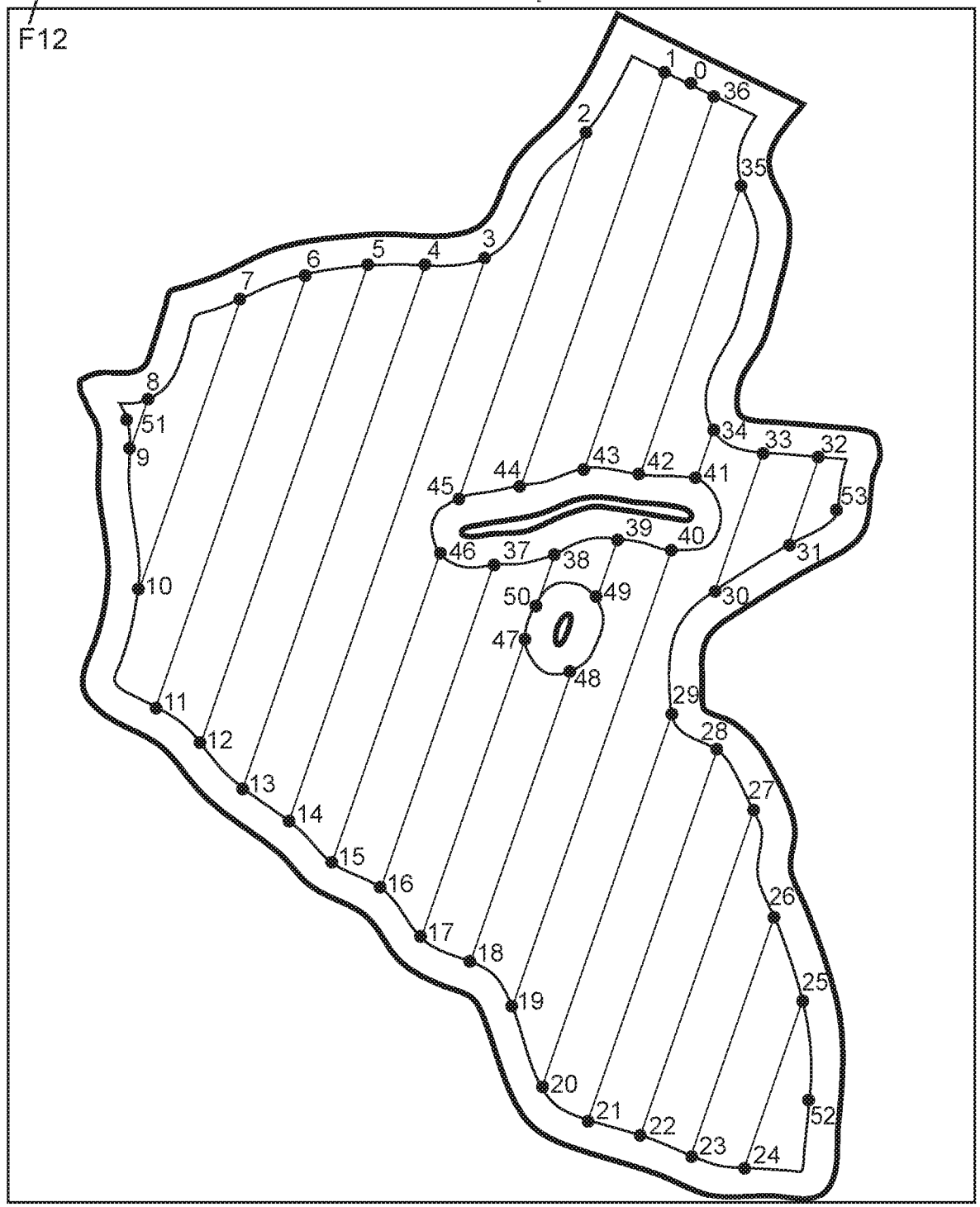
FIG. 5 illustrates an offline-computed path as result of an optimization according to module M3 for an exemplary agricultural field including two interior tree-islands prohibited from trespassing.

FIG. 3, FIG. 4 and FIG. 5 illustrate results when performing the three different optimization modules M1, M2 and M3 for an exemplary field with two interior tree-islands. All of steps S1, S2 and S3 mentioned above and shown in FIG. 1 were conducted. For this particular case, the orientation and the consequent lane grid in block of sub-step 7 were chosen according to the criterion of minimizing the sum of the total pathlength of all interior lane-segments. The resulting cross-point sequences for the three methods of the three modules M1, M2 and M3 which define the pattern or path plan to be covered by the machinery are shown in lists F10, F11 and F12 being part of the corresponding figures FIG. 3, FIG. 4. and FIG. 5.

In the following the algorithms of the optimization modules M1, M2, M3 are described:

First algorithm A1 for the implementation of the first module M1:

1: Inputs:

Connected undirected transition graph $T_{field}$.

Position coordinate information about all edges associated with the transition graph $T_{field}$, i.e., each edge described by an appropriate (in the sense of shape defining) number of position coordinates.

Orientation information (e.g., tilt angle of straight lanes within the coordinate system of consideration).

Position coordinates of all cross-points.

Information about cross-point numbering, in particular, differentiation between perimetric and island-circling lanes.

2: Make $T_{field}$ Eulerian to obtain $T_{field}^*$:

The graph-augmentation is here always conducted in the least-cost manner

3: Application of an algorithm for the determination of an Eulerian cycle on Eulerian graph $T_{field}^*$:

One such algorithm is the End-Pairing algorithm.

The result is an Eulerian cycle described as a cross-points sequence.

4: Application of appropriate heuristics:

In general, for an Eulerian graph such as $T_{field}^*$, there does not exist only one unique corresponding Eulerian cycle.

Appropriate heuristics can be applied to customize the Eulerian cycle.

The first heuristic applied is the replacement of cross-point combinations such as a-b-a-m-n-b-c with a-b-n-m-a-b-c, which avoids the 180°-turn implied by the sequence a-b-a.

The second heuristic applied as discussed below involving starting node 0.

5: Computation of the complete field covering path in terms of a concatenation of position coordinates associated with the Eulerian cycle:

So far, the Eulerian cycle is expressed in form of a sequence of cross-points; by knowledge of sets of coordinates describing the edges, the field-covering path is computed as a concatenation of contiguous position coordinates.

6: Potentially back-rotation:

In case computations were so far carried out in a rotated coordinate system, then now apply the back-rotation of all position coordinates (by the usage of a rotation matrix) to the original coordinate system.

7: Return values:

Complete field covering path expressed as a concatenation of position coordinates (e.g., latitude and longitude, or UTM-coordinates).

Position coordinates of all cross-points.

Complete field covering path expressed as a list of numbered cross-points, see F10 in FIG. 3 for an example.

The complete field coverage path-length.

Second algorithm A2 for the implementation of the second module M2:

1: Inputs:

Connected undirected transition graph $T_{field}$.

Position coordinate information about all edges associated with the transition graph $T_{field}$, i.e., each edge described by an appropriate (in the sense of shape defining) number of position coordinates.

Orientation information (e.g., tilt angle of straight lanes within the coordinate system of consideration).

Position coordinates of all cross-points.

Information about cross-point numbering, in particular, differentiation between perimetric and island-circling lanes.

2: Create undirected transition graph $T_{M2}$:

$T_{M2}$ is created as a copy of $T_{field}$ after the dismissal of all circling island lane-segments (in case there are tree-islands present).

For illustration, with respect to FIG. 4, the dismissed circling bidirectional lane-segments comprise 37-38, 38-39, 39-40, 40-41, 41-42, 42-43, 43-44, 44-45, 45-46, 46-37, 47-48, 48-49, 49-50 and 50-47.

Note that the resulting $T_{M2}$ may not be connected: with respect to FIG. 4, straight-segments 50-39 and 49-39 are not connected to the rest of $T_{M2}$.

If there are no tree-islands, $T_{M2}$ is just a copy of $T_{field}$.

3: Make $T_{M2}$ Eulerian by conducting a graph-augmentation yielding $T_{M2}^*$:

The usual option is to conduct the graph-augmentation in the least-cost manner, however, under the explicit constraint of always ensuring connectivity of $T_{M2}^*$.

Differently motivated graph-augmentations (not cost minimizing) are also admissible and may be, for example, motivated by minimizing the number of steering actions on the final overall field coverage path.

With respect to FIG. 4, a graph-augmentation of $T_{M2}$ may include the pair-wise linking of odd-degree nodes 47-48, 50-49, 38-39, 40-41, 42-43, 44-45 and 46-37; however, this augmentation would result in the closed chain 50-49-39-38-50 being disconnected from the rest of the augmented graph, and is therefore prohibited.

If there are no tree-islands, $T_{M2}^*$ is always equal to $T_{field}^*$.

4: Application of an algorithm for the determination of an Eulerian cycle on Eulerian graph $T_{M2}^*$:

One such algorithm is the End-Pairing algorithm

The result is an Eulerian cycle described in form of a sequence of cross-points.

5: Application of appropriate heuristics:

For Eulerian graph $T_{M2}^*$ there does not exist only one unique corresponding Eulerian cycle.

Appropriate heuristics can be applied to customize the Eulerian cycle.

A first heuristic applied is the replacement of cross-point combinations such as a-b-a-m-n-b-c with a-b-n-m-a-b-c, which avoids the 180°-turn implied by the sequence a-b-a.

A second heuristic applied as discussed below involving starting node 0.

A third heuristic applied is motivated by avoiding 180°-turning, involving the utilization of auxiliary cross-points; this heuristic is pathlength-altering.

6: Alteration of the Eulerian cycle associated with $T_{M2}^*$ by the inclusion of circling island lanes:

The result of this step is referred to as the altered Eulerian cycle associated with $T_{M2}^*$; the original Eulerian cycle does not cover all lanes associated with $T_{field}$, however, the altered Eulerian cycle now does; in particular, in a way that is meant to ensure avoidance of any 180°-turns.

7: Computation of the complete field covering path in terms of a concatenation of position coordinates associated with the altered Eulerian cycle:

So far, the altered Eulerian cycle is expressed in form of a sequence of cross-point numbers.

By knowledge of edges in terms of sets of position coordinates, now compute the field-covering path expressed in terms of contiguous position coordinates.

8: Potentially back-rotation:

In case computations were so far carried out in a rotated coordinate system, then now apply the back-rotation of all position coordinates (by the usage of a rotation matrix) to the original coordinate system.

9: Return values:

Complete field covering path expressed as a concatenation of position coordinates (e.g., latitude and longitude, or UTM-coordinates).

Position coordinates of all cross-points.

Complete field covering path expressed as a list of numbered cross-points, see F11 in FIG. 4 for an example.

The complete field coverage pathlength.

Third algorithm A3 for the implementation of the third module M3:

1: Inputs:

Connected undirected transition graph $T_{field}$.

Position coordinate information about all edges associated with the transition graph $T_{field}$, i.e., each edge described by an appropriate (in the sense of shape defining) number of position coordinates.

Orientation information (e.g., tilt angle of straight lanes within the coordinate system of consideration).

Position coordinates of all cross-points.

Information about cross-point numbering, in particular, differentiation between perimetric and island-circling lanes.

2: Create undirected transition graph $T_{M3}$:
$T_{M3}$ is created as a copy of $T_{field}$ after the removal of all perimetric lane-segments; likewise, in case there exist tree-islands, from $T_{field}$ all circling island lane-segments are dismissed.
Thus, at this stage, $T_{M3}$ consists always of only unconnected interior lanes (usually straights).

3: Extend $T_{M3}$ to a connected undirected graph $\underline{T}_{M3}$:
In order to make $T_{M3}$ connected, lane-segments are added to it.
These added lane-segments are always elements of only the perimetric lane or the circling tree-island lanes.
Lane-segments are added in a least-cost manner while simultaneously avoiding the formation of any loops with the lane-segments already chosen until the resulting graph $\underline{T}_{M3}$ is connected (see J. B. Kruskal, "On the shortest spanning subtree of a graph and the traveling salesman problem", Proceedings of the American Mathematical society, vol. 7, no. 1, pp. 48-50, 1956, for mathematical background).

4: Make $\underline{T}_{M3}$ Eulerian by conducting a graph-augmentation yielding $\underline{T}_{M3}^*$:
The usual option is to conduct the graph-augmentation of $\underline{T}_{M3}$ in the least-cost manner, however, under the explicit constraint of always ensuring connectivity of the resulting $\underline{T}_{M3}^*$.
Differently motivated graph-augmentations (not cost minimizing) are also admissible and may be, for example, motivated by minimizing the number of steering actions on the final overall field coverage path.

5: Application of an algorithm for the determination of an Eulerian cycle on the Eulerian graph $\underline{T}_{M3}^*$:
One such algorithm is the End-Pairing algorithm.
The result is an Eulerian cycle described in form of a sequence of cross-points.

6: Application of appropriate heuristics:
For Eulerian graph $\underline{T}_{M3}^*$ there does not exist only one unique corresponding Eulerian cycle; appropriate heuristics may be applied to customize the Eulerian cycle.

7: Alteration of the Eulerian cycle associated with $\underline{T}_{M3}^*$ by the inclusion of circling island lane-segments and the initial perimetric lane circling:
The direction of the initial perimetric lane circling is selected such that a smooth transition to the next cross-point on the path is ensured avoiding any 180°-turn; for illustration, see the highlighted part of F12 in FIG. 5 and its fluid progression (avoiding any 180°-turning) to the remainder of the field coverage path.
See the description for details about the inclusion of circling island lane-segments.
The result of this step is referred to as the altered Eulerian cycle associated with $\underline{T}_{M3}^*$; the original Eulerian cycle does not cover all lanes associated with $T_{field}$, however, the altered Eulerian cycle now does; in particular, in a way that is meant to ensure avoidance of any 180°-turns.

8: Computation of the complete field covering path in terms of a concatenation of position coordinates associated with the altered Eulerian cycle:
So far, the altered Eulerian cycle is expressed in form of a sequence of cross-point numbers.
By knowledge of edges in terms of sets of position coordinates, now compute the field-covering path expressed in terms of contiguous position coordinates.

9: Potentially back-rotation:
In case computations were so far carried out in a rotated coordinate system, then now apply the back-rotation of all position coordinates (by the usage of a rotation matrix) to the original coordinate system.

10: Return values:
Complete field covering path expressed as a concatenation of position coordinates (e.g., latitude and longitude, or UTM-coordinates).
Position coordinates of all cross-points.
Complete field covering path expressed as a list of numbered cross-points, see F12 in FIG. 5 for an example.
The complete field coverage pathlength.

Figure 6A:
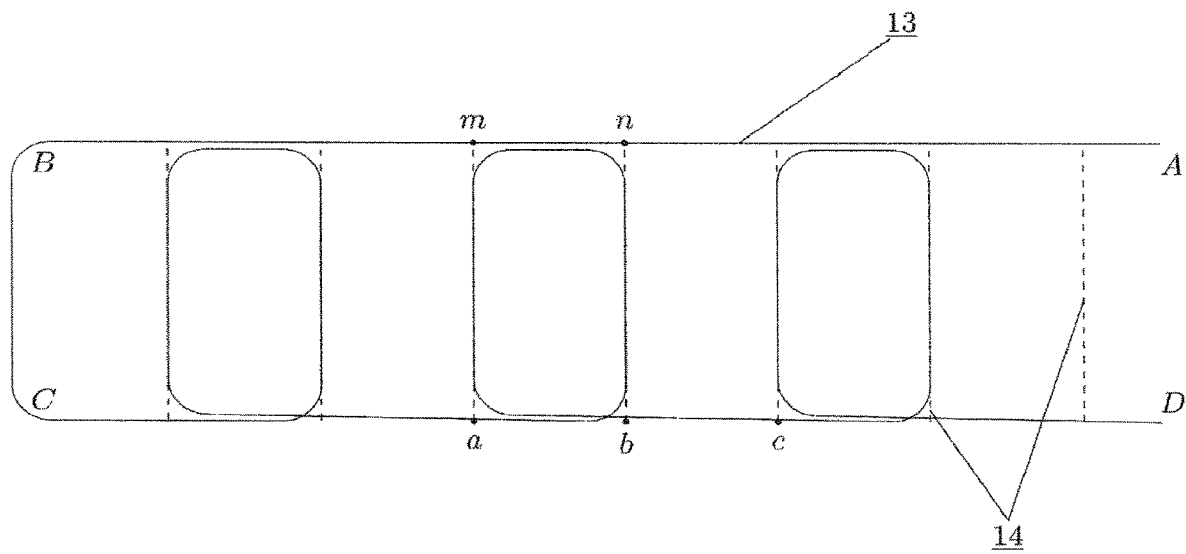
FIG. 6A visualizes a guidance pattern naturally occurring as a result of an optimization according to either one of modules M1 and M2, wherein the field coverage path is intentionally not aligned with straight lanes for better visualization of the underlying cross-points sequence logic and path plan.
Figure 6B:
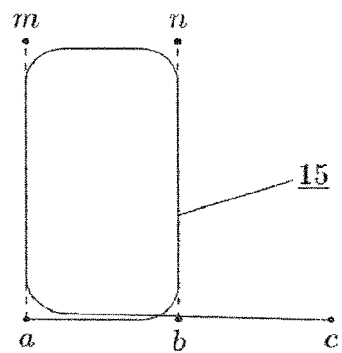
FIG. 6B visualizes a guidance pattern naturally occuring as a result of an optimization according to either one of modules M1 and M2, wherein the field coverage path is intentionally not aligned with straight lanes for better visualization of the underlying cross-points sequence logic and path plan.
Figure 7:
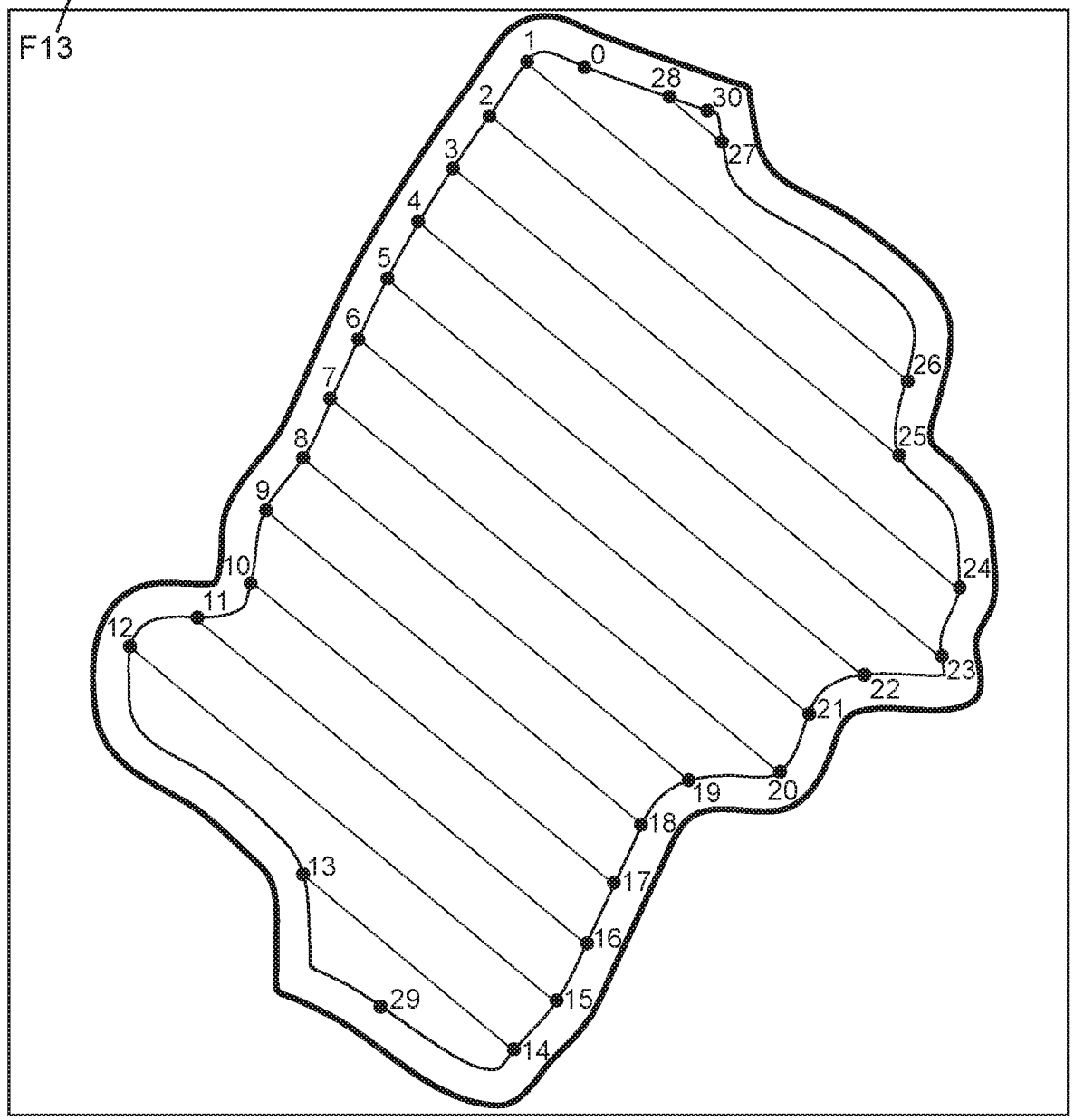
FIG. 7 illustrates an offline-computed path as result of an optimization according to module M2 for an exemplary agricultural field without interior tree-islands prohibited from trespassing.
Figure 8:
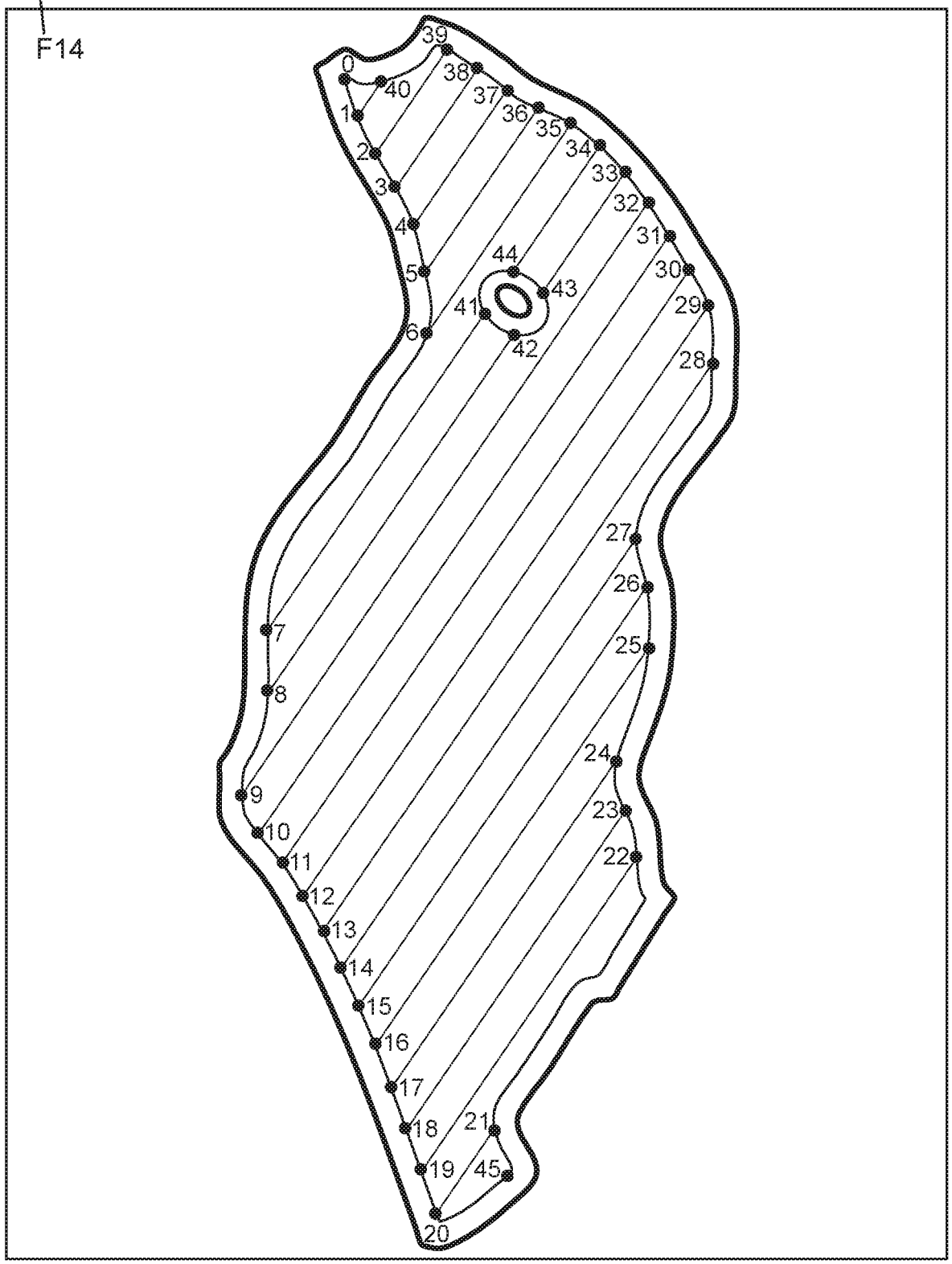
FIG. 8 illustrates an offline-computed path as result of an optimization according to module M2 for an exemplary agricultural field including one interior tree-island prohibited from trespassing.

A guidance pattern naturally occurring as a consequence of the first and second optimization module M1 and M2 is sketched in FIGS. 6A and 6B. This circular driving framework is of particular interest since it not only avoids 180°-turns and is thus simple to drive, but more importantly prescribes how to, in a minimum total pathlength-sense, optimally cover also rectangular or, more generally, regularly shaped fields. FIG. 7 and FIG. 8 emphasize the natural occurrence of this particular guidance pattern as a result of the performed method according to the second optimization module M2—in two real-world settings with naturally shaped field contours. F13 and F14 illustrate the optimal concatenations of cross-points for the two respective fields according to this second module M2. For illustration, the particular guidance pattern under consideration is sketched in FIG. 6A. The minimum total length field coverage path 13 is composed of passing through the headland indicated by reference points A, B and C before then working all straight lanes, denoted by 14, in a specific circular manner (marked with reference number 15 in FIG. 6B), always comprising two straight lanes, until point D is reached. The specific sequence of cross-points for the circular pattern reads a-b-n-m-a-b-c. The reason for optimality of the conjunction of headland path A-B-C and subsequent multiple circular guidance patterns is the coverage of the bottom headland lane (or perimetric lane) "on-the-fly". For total pathlength-optimality, a key is the appropriate pairing of cross-points such that the sum of all lane-parts covered twice, such as a-b and m-n etc., is minimal. Ultimately, as a detail, due to the particular artificial and consecutive numbering of cross-points illustrated, cross-point combinations a-b-c are usually (but not necessarily) increasing, e.g., 15-16-17, 18-19-20 etc. as shown in F13 of FIG. 7, or decreasing, e.g., 18-17-16 or 16-15-14 etc. as displayed in F14 of FIG. 8.

Special attention is meant to be guided to the fact that the circular pattern sketched in FIGS. 6A and 6B may potentially include circling of islands as well. Consider F14 in FIG. 8 and its highlighted cross-point sequence . . . -8-7-41-44-43-42-41-44-34-33-43-42-8-7-6- . . . which includes the particular circular guidance pattern 8-7-34-33-8-7-6 interrupted by the circling of the tree-island 41-44-43-42-41. It is emphasized that the given concatenation of cross-points is no coincidence but enforced by the design of the algorithm, i.e., the tree-island is made Eulerian along the straight lane-segments. This means that cross-points 41 with 44 and 42 with 43 are connected during the Eulerian-step of the second module M2 algorithm A2. The Eulerian-step of the second algorithm A2 is always conducted such that it ensures reachability of all cross-points and thus coverage of the complete field. Suppose the two tree-islands in FIG. 4 are made Eulerian by duplicating cross-point pairings 47-48, 49-50, 38-39, 40-41, 42-43, 44-45, 46-37 which for the given field under consideration would be pathlength-optimal, the quadrilateral cycle 50-49-39-38-50 would then be created disconnected from all other cross-points after the Eulerian-step.

Figure 9A:
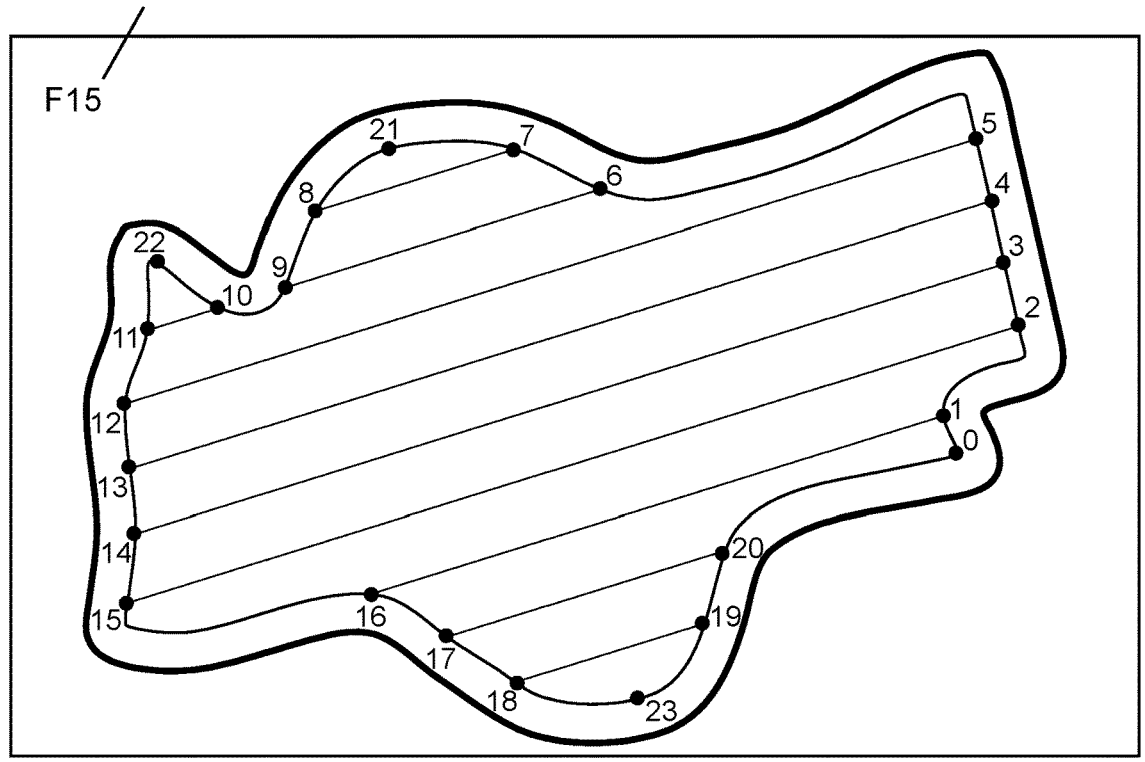
FIG. 9A illustrates the difference between the results obtained when applying optimization according to module M1 to an exemplary agricultural field not including any interior tree-islands prohibited from trespassing.

As mentioned in the procedure P of the framework, auxiliary cross-points (nodes) were introduced to ensure unique connections between any two cross-points. With respect to FIGS. 9A and 9B, such auxiliary inserted cross-points are numbered 21, 22 and 23. Consider the case of cross-point 23. Without its existence, the connection between cross-points 18 and 19 would not be uniquely defined. These auxiliary cross-points are also of particular interest for the second module M2. Suppose the edge 18-19 is element of the list of pairings that make transition graph $T_{M2}$ Eulerian. Then, the edge 18-19 will be passed through twice. This fact, in combination with cross-points 18 and 19 each having only one non-auxiliary cross-point neighbor, implies the shortest path for coverage of the 18-19 edge to be the cross-point sequence 18-19-18. As shown in FIG. 9A, see F15, this sequence occurs naturally in the M1-solution. The disadvantage of this sequence is, however, the 180°-turn. For this practical reason, cross-point sequences such as 18-19-18 are therefore in the second module M2 always replaced by utilizing the neighboring cross-point. Thus, a sequence of 18-19-18 is in the second module M2 replaced (in the heuristics step), see second algorithm A2, by the sequence 18-19-23-18, for illustration highlighted in F16 of FIG. 9B. This heuristic is also used for the module M3, for example, see F12 in FIG. 5, where the 180°-turn implied by 24-25-24 is altered to 24-25-52-24.

Suppose the starting and end node (entrance and exit to the field), always denoted as cross-point 0, lies on a lane-segment belonging to the list of pairings that make a connected undirected transition graph T Eulerian. For illustration, consider FIG. 9A or 9B, where the odd vertices 20 and 1 are paired via path 20-0-1 and belong to the list of pairings that make T Eulerian. Then, for the Eulerian tour, the undirected edges 20-0 and 0-1 must each be passed twice. In such a case, by, for example, the application of the End-Pairing algorithm described in Eiselt et al. (1995), i.e. the citation mentioned first in this text, the last seven cross-points of a valid Eulerian tour may be 1-16-17-20-0-1-0, which imply the 180°-turn 0-1-0. To avoid this 180°-turn, a heuristic is motivated which always replaces sequences for the last cross-points of an Eulerian tour in the general form of x-k-l-m-0-x-0 by x-0-m-l-k-x-0. This does not alter the pathlength, but just the sequence of covered cross-points. This heuristic is therefore not only applicable to the second module M2-method but also to first module M1. With respect to FIGS. 9A and 9B, by the application of the discussed heuristic, 1-16-17-20-0-1-0 is transformed to 1-0-20-17-16-1-0 as indicated in F15 and F16 for the corresponding first and second modules M1 and M2.

Another heuristic follows the concept of circling a tree-island as soon as any cross-point associated with that tree-island is reached for the first time by the vehicle. This heuristic is employed by both the methods according to the second and third module M2 and M3. For illustration, consider FIG. 4 and the cross-point sequence 0-36-35-42-43 which is part of an Eulerian cycle associated with $T_{M2}^*$. Cross-point 42 belongs to the circling tree-island lane described by cross-points {37, 38, 39, 40, 41, 42, 43, 44, 45, 46}. The strategy is then to incorporate these cross-points into the Eulerian cycle associated with $T_{M2}^*$ and thus obtain 0-36-35-42-43-44-45-46-37-38-39-40-41-42-43-... as indicated in F11 of FIG. 4. Note that the order of the added circling tree-island cross-point sequence is always chosen such that a smooth transition to the next cross-point on the path is ensured avoiding any 180°-turn. Consider for visualization the second tree-island in FIG. 4 given by the cross-point set {47, 48, 49, 50}. The cross-point sequence 19-18-17-47-50 is part of the Eulerian cycle associated with $T_{M2}^*$ and the second tree-island is reached for the first time at cross-point 47. Thus, according to the strategy and since, according to the Eulerian cycle, the cross-point following 47 is 50, we round the tree-island clock-wise and obtain the updated path 19-18-17-47-50-49-48-47-50-... as indicated in F11 of FIG. 4. Ultimately, it is pointed out that the strategy described in this paragraph is explicitly coordinated with the way how the undirected graph $T_{M2}$ is created, see algorithm A2. The fundamental motivation is the purpose, of ensuring 180°-turns are avoided even if tree-islands are existent in the interior of the work area.

Figure 9B:
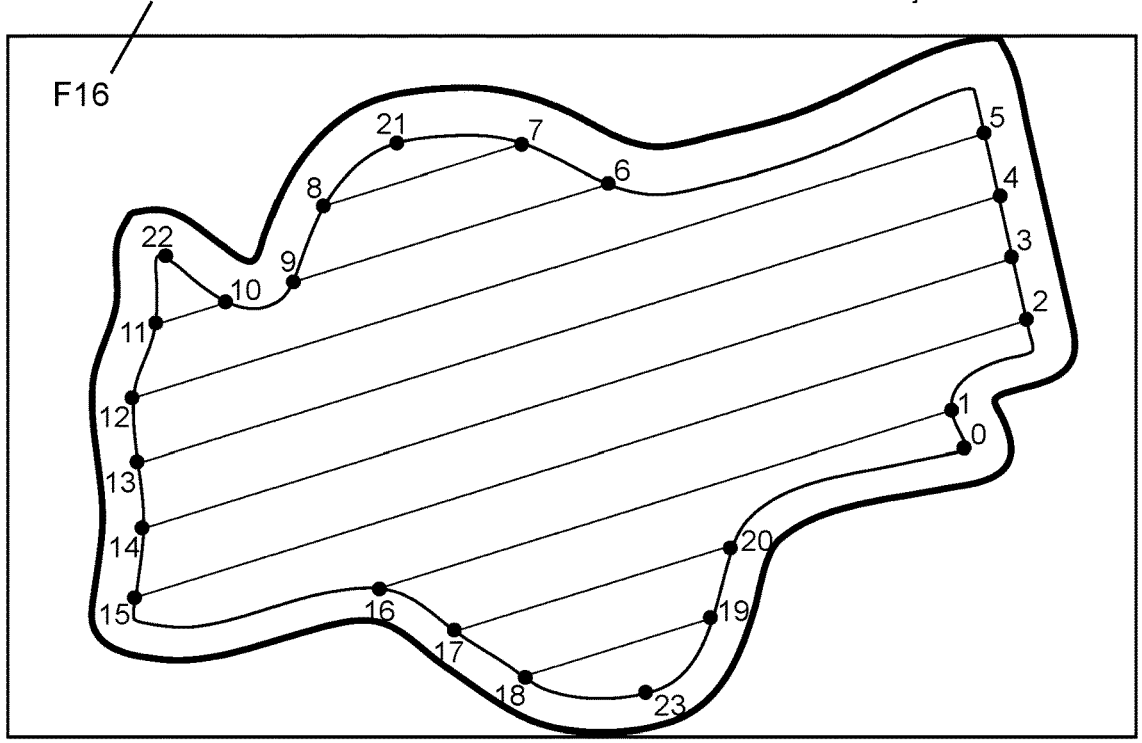
FIG. 9B illustrates the difference between the results obtained when applying optimization according to module M2 to an exemplary agricultural field not including any interior tree-islands prohibited from trespassing.

FIGS. 9A and 9B compare the typical results of the first and second module M1 and M2, respectively, for an exemplary field not including any interior tree-islands prohibited from trespassing. The cross-point sequence corresponding to the first module M1 is shown in F15, and the result associated with the first module M2 in F16. The differences between the two solutions are highlighted. In case of the second module M2, the path is altered according to the logic described herein in order to avoid the two 180°-turns characteristic for the first module M1. Besides this, there is no difference in path, which is conceptually always the case if no tree-islands are existent in the interior of the work area.

Figure 10:
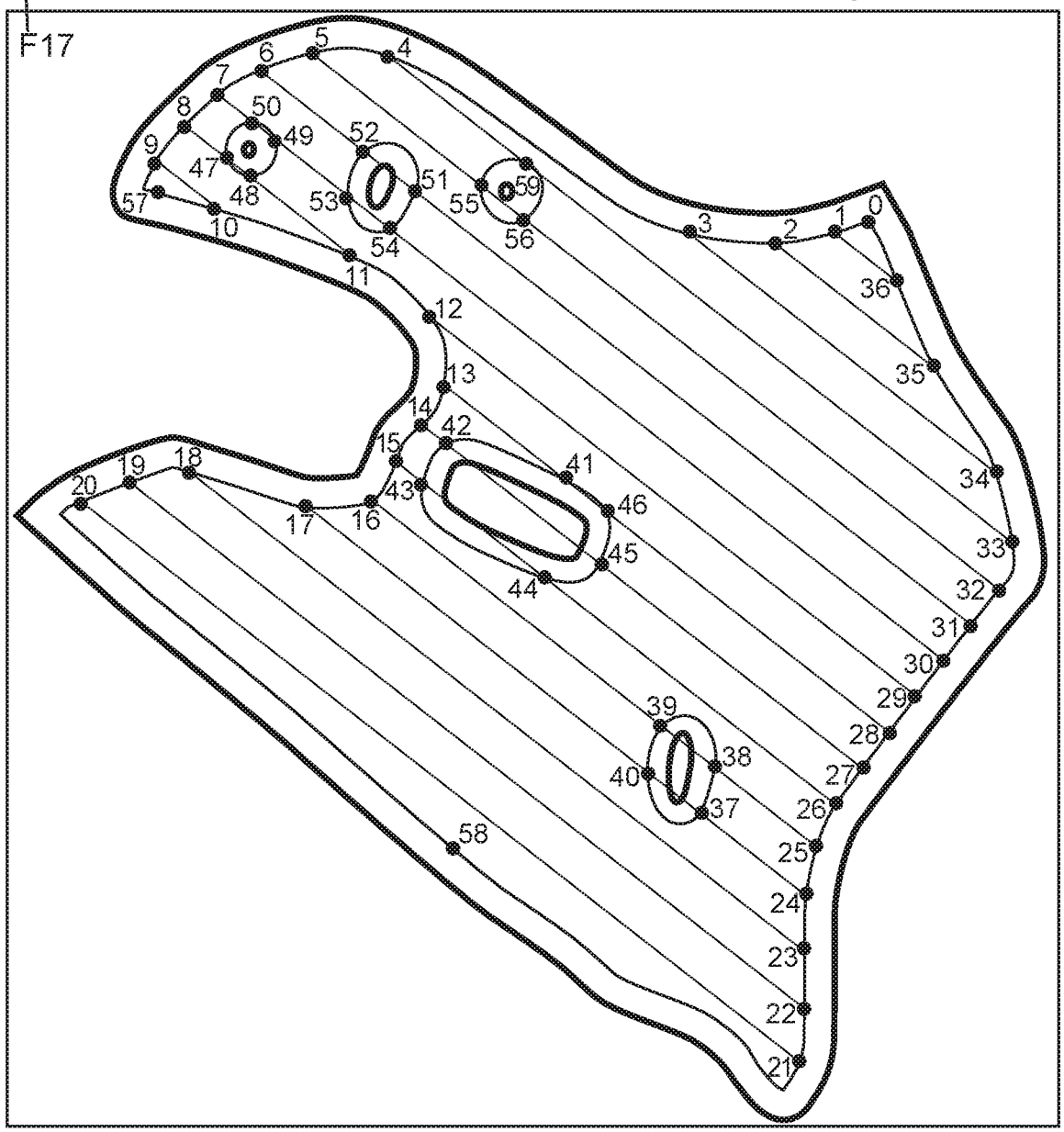
FIG. 10 illustrates an offline-computed path as result of an optimization according to module M2 for an exemplary agricultural field including multiple interior tree-islands prohibited from trespassing and FIG. 11A illustrates an efficient on/off switching scheduling of a fertilizing or spraying application machine mounted on a vehicle system moving along the path plan according to FIGS. 6A or 6B.

FIG. 10 is meant to further illustrate the suitability and characteristics of a typical field coverage path, see F17, returned by the second module M2 for an exemplary agricultural field including multiple interior tree-islands prohibited from trespassing.

The turning trajectories and dynamics of the vehicle at headlands or in general are not taken into account explicitly in the drawings, see, e.g., FIG. 7. This is also due to the fact of the applicability of the present invention to a great variety of vehicles, scales and shapes of closed fields. The omission of precise turning trajectories does not violate functionality of the devised algorithms in any sense. An inclusion and description of precise turning trajectories is to be considered as a more detailed modeling of the lane-grid fitted to the particular field-shape and may be of specific importance in step 7 of FIG. 1, when selecting the orientation of the lane-grid, for example, according to the criterion of avoiding volts and sharp turns.

The methods underlying this invention for the computation of vehicle paths for complete field coverage are also of interest in combination with variable rate applications for, e.g., spraying and fertilizing. The tracking of offline-computed and thus known paths can be used as feedforward information for the variable rate application controllers. Alternatively, this information can also be used for vehicles not equipped with expensive automated variable rate application apparati in the sense that in form of visual and audio support the human vehicle driver can be signaled where and when to switch off, e.g., spraying and fertilizing machinery when covering a particular lane-segment, for example, for the second time. The switching-information provided to the user can be further refined when taking dynamic mathematical models of vehicle, trailer and, e.g., spraying machinery into account, for example, for the modeling and prediction of dynamical response times.

Figure 11A:
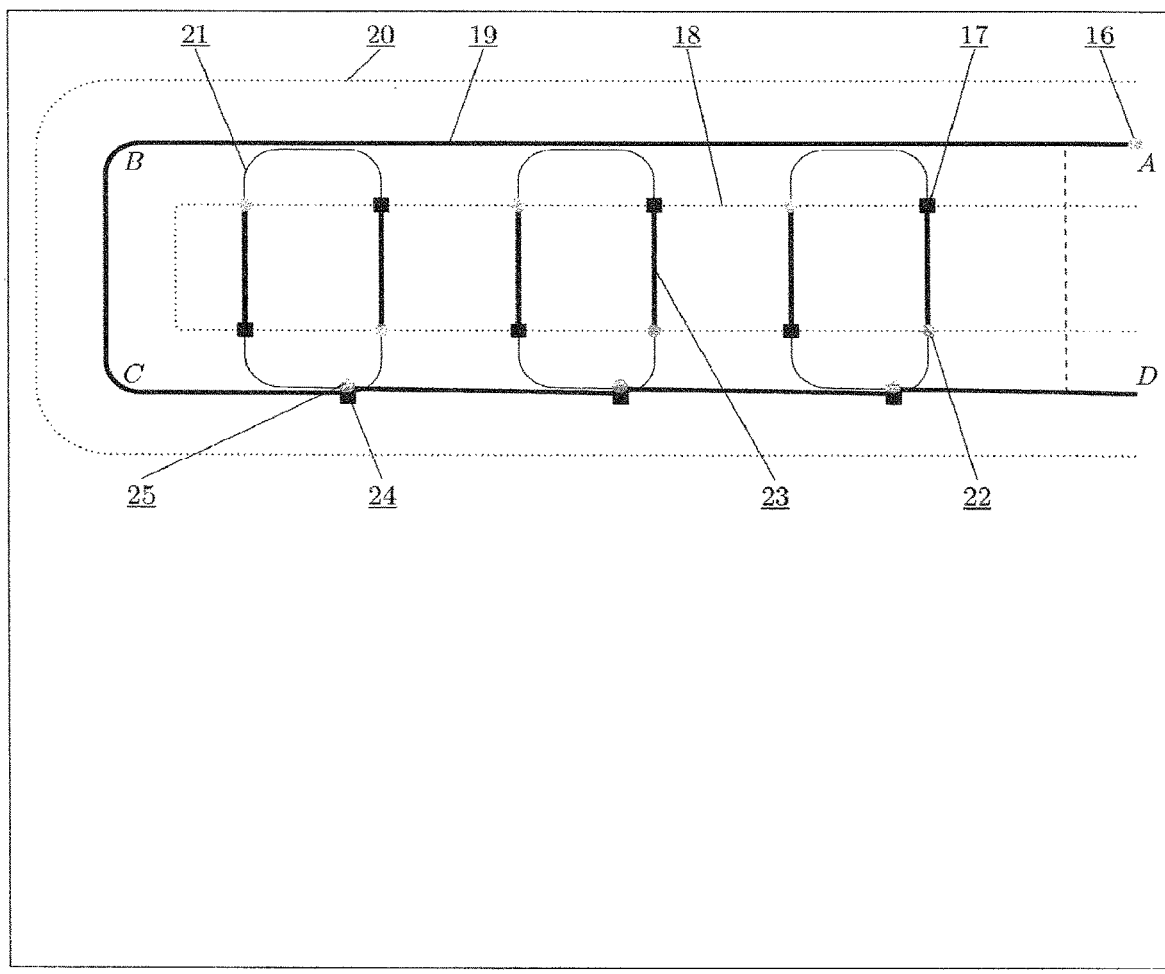
Figure 11B:
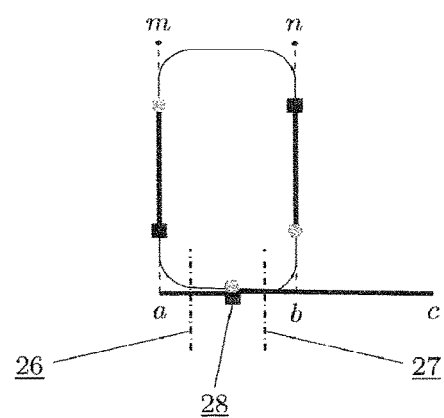
FIG. 11B illustrates an efficient on/off switching scheduling of a fertilizing or spraying application machine mounted on a vehicle system moving along the path plan according to FIGS. 6A or 6B.

FIGS. 11A and 11B illustrate an efficient overlap-avoiding on/off switching scheduling of fertilizer spreaders or spraying application machineries that are mounted on a vehicle system and operating perpendicularly to the vehicle direction of travel with a specific operating width. Specifically, the scheduling is tailored to the path planning methods for field coverage presented above. The fundamental objective is the avoidance of fertilizing or spraying overlap, i.e., the avoidance of additional application of fertilizers, sprays or similar substances on areas already served, when moving along a path plan for field coverage as, e.g., devised by method M2 and as further illustrated in FIGS. 6A or 6B. The operating width of the agricultural machinery is marked with reference numbers 20 and 18, here referred to as field contour and "headland application bound", respectively. On and off switching of fertilizer spreaders or spraying application machineries are indicated by circular and square markers, having reference numbers 25 for "on" and 24 for "off", respectively. It is distinguished between, first, path segments with switching on (application of fertilizers or sprays) as illustrated by thickened line 19 or 23, and, second, path segments with switching off (no application of fertilizers or sprays) illustrated by thinner lines as in 21. It is further distinguished between, first, switching decisions to be taken at intersections of interior lanes and application bounds such as indicated by 17, 22, and, second, switching decisions to be taken at positions 24 and 25, both located along headland lanes. This distinction is required as a result of the devised path planning methods for field coverage, in particular according to mathematical algorithm M2. It is further different to existing sequential lane-by-lane operation where efficient overlap avoidance is already achieved by switching at only the intersections of interior lanes and application bounds (and not additionally along headland path segments), however, at the cost of an increased pathlength stemming from a continuous headland path coverage, typically before the coverage of any interior lanes, or, alternatively, after the coverage of all interior lanes. In contrast, characteristic to mathematical algorithm M2 is a shortened pathlength, however, at the cost of requiring two more switching decisions per every two interior lanes, as visually exemplified in FIGS. 11A and 11B.

According to an embodiment, an efficient switching scheduling for overlap avoidance, as further visualized in FIGS. 11A and 11B, has to be taken anywhere in between the end and the beginning of turning maneuvers of, first, traversing from an interior lane towards a headland lane as illustrated by reference number 26, and, second, traversing from a headland lane towards an interior lane as illustrated by 27, respectively. With respect to the traversal pattern from FIGS. 6A and 6B, i.e., a-b-n-m-c, as further visualized in FIGS. 11A and 11B, the efficient switching sequence for overlap avoidance is characterized by:

1) coming from node a with switching on, switch off at 28,
2) continue driving (passing node b) until the next intersection of application bound and interior lane where switch on,
3) continue until the next intersection of application bound and interior lane where switch off,
4) continue driving (passing node n and m) until reaching of the next intersection of application bound and interior lane where switch on,
5) continue driving, and switch off at the next intersection of application bound and interior lane,
6) continue driving (passing a) until reaching of location 28 where fertilizer sprayers or spray applications are now switched on,
7) finally, continue to drive until node c while keeping switched on.

The headland lane between node n and m is covered when initially, and typically for method M2, traversing more than half of the headland path with switching on, as illustrated in FIGS. 11A and 11B as the traversal from 16 until the first off-switching at position 24.

Although examples are described in detail herein with references to corresponding drawing for the illustration of embodiments, it is to be understood that the examples are not limited to those detailed descriptions and illustrations. Variations to specific embodiments and details are encompassed by this disclosure. Variations in the order or hierarchy of steps may be made in carrying out the above system and method. It is intended that all matter contained in the above description and shown in the accompanying drawings shall be interpreted as illustrative and not in a limiting sense.

The invention claimed is:

1. A method for automatically path planning for optimizing a path of a machinery moving in an area, the method comprising the steps of determining at least the following parameters:
    coordinates of an area-contour,
    an operating width of the moving machinery,
    a distance between the area-contour and a perimetric closed machinery path within the area-contour,
    making a copy of the area-contour and geometrically translating this copy in parallel by the distance to an interior of the area, thereby obtaining an eroded area being smaller or equal than the area and an eroded area contour,
    selecting an orientation of lanes within an interior of the eroded area contour, denoted as interior lanes, and thereby partitioning the eroded area into adjacent lanes,
    intersecting the interior lanes with the eroded area contour, thereby generating a lane grid and a corresponding connected undirected transition graph $T_{field}$ of the area,
    performing a mathematical algorithm for determining a shortest path by utilizing the determined parameters, the eroded area and the generated lane grid, thereby determining an optimized sequence of position coordinates on the lane grid wherein a complete area covering path is generated,
    wherein the mathematical algorithm uses as an input a connected undirected transition graph $T_{field}$ of the area, position coordinate information about all cross-points associated with the transition graph and orientation information of the interior lanes, wherein the mathematical algorithm creates an undirected transition graph $T_{M2}$ by copying the connected undirected transition graph $T_{field}$, wherein the mathematical algorithm makes this undirected transition graph $T_{M2}$ Eulerian by conducting a graph-augmentation to obtain an Eulerian graph $T_{M2}^*$, wherein the mathematical algorithm determines an Eulerian cycle applied on this Eulerian graph $T_{M2}^*$, the Eulerian cycle being a sequence of cross-points and wherein the mathematical algorithm computes a complete area covering path in terms of a concatenation of position coordinates associated with the Eulerian cycle thereby applying heuristics.

2. The method of claim 1, wherein the determined parameters additionally include coordinates of a contour of any island being present within the area, wherein the island is not to passed by the moving machinery, and wherein the method comprises the further steps of
    making a copy of the contour of any island and geometrically translating this copy in parallel by the distance away from the island interior, thereby obtaining a corrected eroded area and an eroded island-contour of any island being present within the area and
    performing the algorithm based on this corrected eroded area, wherein the mathematical algorithm creates an undirected transition graph $T_{M2}$ by copying the connected undirected transition graph $T_{field}$ after dismissal of any available edges identifying the eroded island area contour of any island being present within the area.

3. The method of claim 1, wherein the orientation of interior lanes is selected according to one of the criteria of: minimization of accumulated length of interior lanes, minimization of accumulated turning when traversing between interior and headland as well as island lane, minimization of maximal turning when traversing between interior and headland as well as island lanes, minimization of accumulated absolute vehicle roll angles above a user-defined threshold resulting from field slopes in hilly terrain along interior lanes, minimization of maximal absolute vehicle roll angles resulting from field slopes in hilly terrain along interior lanes, avoidance of absolute vehicle roll angles above a user-defined threshold resulting from field slopes in hilly terrain, connections to roads and logistical harvesting organization, minimization of total field coverage pathlength, minimization of completion time for field coverage, as well as a weighted trade-off between at least some of the aforementioned criteria.

4. The method of claim 1, wherein the method provides as an output at least the sequence of position coordinates, the sequence giving the path to be followed by the machinery.

5. The method of claim 1, wherein the method provides as an output a cross-points sequence, the cross-points referring to coordinates in the interior of the area at which multiple driving directions exist, the sequence giving instruction about which driving direction is required to continue the path, the cross-points sequence thereby giving the path to be followed by the machinery.

6. The method of claim 1, wherein the determined parameters additionally include a first information that 180° turns of the machinery including reverse movement of the machinery are performed and a second information that 180° turns of the machinery including reverse movement of the machinery are not performed, and wherein the method is performed using the first information or the second information.

7. A first software program for performing the method of claim 1, the first software program comprising the algorithm for computing the complete area covering path.

8. A second software program comprising storing means for storing data identifying the complete area covering path which path is based on position coordinates of the machinery and an output cross-points sequence obtained according to the method of claim 1, the cross-points referring to coordinates in the interior of the area and the sequence giving the path to be followed by the machinery, and the second software program gives guidance to a machinery and/or a user of a machinery in order to enable the machinery to follow the path by usage of information of at least one location sensor.

9. A device for performing the method according to claim 1, wherein the device comprises input means for providing the parameters, means for reading of geographic location measurements returned from a location or positioning sensor and for choosing heuristics and wherein the device comprises
  display means for displaying data enabling the machinery and/or a user of the machinery to follow the path and/or
  output means for delivering data enabling the machinery and/or a user of the machinery to follow the path.

10. The method of claim 1, wherein the method is used for overlap-avoiding on/off switching guidance of fertilizer spreaders or spraying application devices mounted on a machinery, when the machinery is following the generated area covering path, the method comprising the steps of
  switching at intersections of interior lanes and headland application bound contours, whereby headland application bound contours are defined as the contours locally perpendicular to any field or island area contours with the distance being the application or machinery operating width;
  switching at positions along perimetric lanes anywhere in between the end and the beginning of turning maneuvers of, first, traversing from an interior lane towards a perimetric lane, and, second, traversing from a perimetric lane towards an interior lane, respectively.

11. The method of claim 1, wherein the method is used for overlap-avoiding on/off switching guidance of fertilizer spreaders or spraying application devices mounted on a machinery, when the machinery is following the generated area covering path, the method comprising the steps of
  switching at intersections of interior lanes and headland application bound contours, whereby headland application bound contours are defined as the contours locally perpendicular to any field or island area contours with the distance being the application or machinery operating width;
  switching at positions along perimetric lanes anywhere in between the end and the beginning of turning maneuvers of, first, traversing from an interior lane towards a perimetric lane, and, second, traversing from a perimetric lane towards an interior lane, respectively.

12. A device for performing the method according to claim 11, wherein the device comprises input means for providing the path plan for field coverage, means for reading of geographic location measurements returned from a location or positioning sensor and wherein the device comprises
  display means for displaying data enabling the machinery and/or a user of the machinery to engage on/off switching of fertilizer spreaders or spraying application machineries mounted on a vehicle system and/or
  output means for delivering data enabling the machinery and/or a user of the machinery to engage on/off switching of fertilizer spreaders or spraying application machineries mounted on a vehicle system.

13. A method for automatically path planning for optimizing a path of a machinery moving in an area, the method comprising the steps of determining at least the following parameters:
  coordinates of an area-contour,
  an operating width of the moving machinery,
  a distance between the area-contour and a perimetric closed machinery path within the area-contour,
  making a copy of the area-contour and geometrically translating this copy in parallel by the distance to an interior of the area, thereby obtaining an eroded area being smaller or equal than the area and an eroded area contour,
  selecting an orientation of lanes within an interior of the eroded area contour, denoted as interior lanes, and thereby partitioning the eroded area into adjacent lanes,
  intersecting the interior lanes with the eroded area contour, thereby generating a lane grid and a corresponding connected undirected transition graph $T_{field}$ of the area,
  performing a mathematical algorithm for determining a shortest path by utilizing the determined parameters, the eroded area and the provided lane grid, thereby determining an optimized sequence of position coordinates on the lane grid wherein a complete area covering path is generated,
  wherein the mathematical algorithm uses as an input a connected undirected transition graph $T_{field}$ of the area, position coordinate information about all cross-points associated with the transition graph and orientation information of the interior lanes, wherein the mathematical algorithm creates an undirected transition graph $T_{M3}$ by copying the connected undirected transition graph $T_{field}$ after dismissal of all edges referring to the eroded area-contour, wherein the mathematical algorithm extends this undirected transition graph $T_{M3}$ to a connected undirected graph $T_{M3}$ by including some of the formerly excluded edges to $T_{M3}$ under consideration of heuristics, wherein the mathematical algorithm makes this connected undirected graph $T_{M3}$ Eulerian by conducting a graph-augmentation under consideration of heuristics in order to obtain an Eulerian graph $T_{M3}*$, wherein the mathematical algorithm determines an Eulerian cycle applied on this Eulerian graph $T_{M3}*$, the Eulerian cycle being a sequence of cross-points and wherein the mathematical algorithm computes a complete area covering path in terms of a concatenation of position coordinates associated with the Eulerian cycle thereby applying heuristics.

14. The method of claim 13, wherein the method is used for overlap-avoiding on/off switching guidance of fertilizer spreaders or spraying application devices mounted on a machinery, when the machinery is following the generated area covering path, the method comprising the steps of
switching at intersections of interior lanes and headland application bound contours, whereby headland application bound contours are defined as the contours locally perpendicular to any field or island area contours with the distance being the application or machinery operating width;
switching at positions along perimetric lanes anywhere in between the end and the beginning of turning maneuvers of, first, traversing from an interior lane towards a perimetric lane, and, second, traversing from a perimetric lane towards an interior lane, respectively.

15. The method of claim 13, wherein the orientation of interior lanes is selected according to one of the criteria of: minimization of accumulated length of interior lanes, minimization of accumulated turning when traversing between interior and headland as well as island lane, minimization of maximal turning when traversing between interior and headland as well as island lanes, minimization of accumulated absolute vehicle roll angles above a user-defined threshold resulting from field slopes in hilly terrain along interior lanes, minimization of maximal absolute vehicle roll angles resulting from field slopes in hilly terrain along interior lanes, avoidance of absolute vehicle roll angles above a user-defined threshold resulting from field slopes in hilly terrain, considerations about connections to roads and logistical harvesting organization, minimization of total field coverage pathlength, minimization of completion time for field coverage, as well as a weighted combination of at least some of the aforementioned criteria.

16. The method of claim 13, wherein the method provides as an output at least the sequence of position coordinates, the sequence giving the path to be followed by the machinery.

17. The method of claim 13, wherein the method provides as an output a cross-points sequence, the cross-points referring to coordinates in the interior of the area at which multiple driving directions exist, the sequence giving instruction about which driving direction is required to continue the path, the cross-points sequence thereby giving the path to be followed by the machinery.

18. The method of claim 13, wherein the determined parameters additionally include the information that 180° turns of the machinery including reverse movement of the machinery are performed and wherein the method is performed using the information.

19. A first software program for performing the method of claim 13, the first software program comprising the algorithm for computing the complete area covering path.

20. A second software program comprising storing means for storing data referring to the complete area covering path which path is based on position coordinates of the machinery and an output cross-points sequence obtained according to the method of claim 13, the cross-points referring to coordinates in the interior of the area and the sequence giving the path to be followed by the machinery, and the second software program gives guidance to a machinery and/or a user of a machinery in order to enable the machinery to follow the path by usage of information of at least one location sensor.

21. A device for performing the method according to claim 13, wherein the device comprises input means for providing the parameters, means for reading of geographic location measurements returned from a location or positioning sensor and for choosing heuristics and wherein the device comprises
display means for displaying data enabling the machinery and/or a user of the machinery to follow the path and/or
output means for delivering data enabling the machinery and/or a user of the machinery to follow the path.

22. The method of claim 13, wherein the parameters additionally include coordinates of a contour of any island being present within the area, wherein the island is not to be passed by the moving machinery, and wherein the method comprises the further steps of
making a copy of the contour of any island and geometrically translating this copy in parallel by the distance away from the island interior, thereby obtaining a corrected eroded area and an eroded island-contour of any island being present within the area and
performing the algorithm based on this corrected eroded area.

23. The method of claim 22, wherein the mathematical algorithm uses as an input a connected undirected transition graph $T_{field}$ of the area, position coordinate information about all cross-points associated with the transition graph and orientation information of the interior lanes, wherein the mathematical algorithm creates an undirected transition graph $T_{M3}$ by copying the connected undirected transition graph $T_{field}$ after dismissal of all edges identifying the eroded area-contour, wherein the mathematical algorithm extends this undirected transition graph $T_{M3}$ to a connected undirected graph $T_{M3}$ by including at least some of the formerly excluded edges to $T_{M3}$ utilizing heuristics, wherein the mathematical algorithm makes this connected undirected graph $T_{M3}$ Eulerian by conducting a graph-augmentation utilizing heuristics in order to obtain an Eulerian graph $T_{M3}*$, wherein the mathematical algorithm determines an Eulerian cycle applied on this Eulerian graph $T_{M3}*$, the Eulerian cycle being a sequence of cross-points and wherein the mathematical algorithm computes a complete area covering path in terms of a concatenation of position coordinates associated with the Eulerian cycle thereby applying appropriate heuristics and wherein the mathematical algorithm further comprises the step of excluding island lanes from the undirected transition graph $T_{M3}$ and the step of altering the Eulerian cycle by the inclusion of formerly excluded island lanes after having determined the Eulerian cycle on the augmented Eulerian graph $T_{M3}*$ and after having applied heuristics, but before the complete area covering path is computed.

\* \* \* \* \*